US 10,857,894 B2

(12) United States Patent
Hosaka et al.

(10) Patent No.: US 10,857,894 B2
(45) Date of Patent: Dec. 8, 2020

(54) CONTROL APPARATUS, ELECTRICAL POWER STORAGE APPARATUS AND SYSTEM FOR MOBILE OBJECT

(71) Applicant: TAIYO YUDEN CO., LTD., Tokyo (JP)

(72) Inventors: Yasuo Hosaka, Tokyo (JP); Satoru Shimizu, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 283 days.

(21) Appl. No.: 15/750,445

(22) PCT Filed: Jul. 20, 2016

(86) PCT No.: PCT/JP2016/071326
§ 371 (c)(1),
(2) Date: Feb. 5, 2018

(87) PCT Pub. No.: WO2017/033631
PCT Pub. Date: Mar. 2, 2017

(65) Prior Publication Data
US 2018/0222332 A1    Aug. 9, 2018

(30) Foreign Application Priority Data
Aug. 25, 2015 (JP) ................. 2015-165593

(51) Int. Cl.
*B60L 53/00* (2019.01)
*B62M 6/45* (2010.01)
(Continued)

(52) U.S. Cl.
CPC .............. *B60L 53/00* (2019.02); *B60L 15/20* (2013.01); *B60L 50/20* (2019.02); *B60L 53/16* (2019.02);
(Continued)

(58) Field of Classification Search
CPC .......... B60L 53/00; B60L 15/20; B60L 53/16; B60L 50/20; B60L 2240/42;
(Continued)

(56) References Cited

U.S. PATENT DOCUMENTS 5,945,808 A    8/1999 Kikuchi et al.
6,454,053 B2 *  9/2002 Tominaga ................. B66B 1/30
                                                     187/290
(Continued)

FOREIGN PATENT DOCUMENTS

EP    2979919 A1    2/2016
JP    2-197223 A    8/1990
(Continued)

OTHER PUBLICATIONS

Japanese Office Action dated Feb. 27, 2018, in a counterpart Japanese patent application No. 2015-165593. (A machine translation (not reviewed for accuracy) attached.).
(Continued)

*Primary Examiner* — Pinping Sun
(74) *Attorney, Agent, or Firm* — Stein IP, LLC

(57) ABSTRACT

This control apparatus includes (A) a first connecting part, which is connected with a driving control apparatus for controlling driving of a power unit for assisting a human power or with the power unit, and through which a current relating to charging and discharging of an electrical power storage device flows, (B) a second connecting part, which is provided separately from the first connecting part, and through which a current relating to charging to the electrical power storage device flows via an electrical connection, and (C) a controller to control charging and discharging of the electrical power storage device, which are performed by using a current, which flows in the first connecting part and/or the second connecting part.

13 Claims, 27 Drawing Sheets

(51) Int. Cl.
*H02J 7/14* (2006.01)
*B60L 15/20* (2006.01)
*B60L 53/16* (2019.01)
*B60L 50/20* (2019.01)
*H02J 7/24* (2006.01)
*B62M 6/40* (2010.01)
*B62M 6/90* (2010.01)
*H02J 7/00* (2006.01)
*H02P 27/06* (2006.01)

(52) U.S. Cl.
CPC ............. *B62M 6/40* (2013.01); *B62M 6/45* (2013.01); *B62M 6/90* (2013.01); *H02J 7/1407* (2013.01); *H02J 7/24* (2013.01); *B60L 2200/12* (2013.01); *B60L 2240/42* (2013.01); *B60L 2240/429* (2013.01); *B60L 2250/26* (2013.01); *H02J 7/0022* (2013.01); *H02J 7/1423* (2013.01); *H02J 2207/40* (2020.01); *H02P 27/06* (2013.01)

(58) Field of Classification Search
CPC .......... B60L 2240/429; B60L 2250/26; B60L 2200/12; H02J 7/24; H02J 2207/40; H02J 7/1407; H02J 7/0022; H02J 7/1423; H02J 2310/48; B62M 6/45; B62M 6/40; B62M 6/90; H02P 27/06
See application file for complete search history.

(56) References Cited

U.S. PATENT DOCUMENTS

| | | | | |
|---|---|---|---|---|
| 8,368,355 | B2 * | 2/2013 | Tam | H02J 7/045 320/128 |
| 8,653,789 | B2 * | 2/2014 | Chen | H02J 7/00 320/111 |
| 2011/0304200 | A1 | 12/2011 | Saida et al. | |
| 2012/0086406 | A1 * | 4/2012 | Maeagawa | H02J 7/008 320/162 |
| 2012/0292990 | A1 | 11/2012 | Watanabe et al. | |
| 2013/0057075 | A1 * | 3/2013 | Kim | H02J 7/0071 307/72 |
| 2013/0264975 | A1 * | 10/2013 | Kaita | B60L 15/007 318/139 |
| 2013/0314039 | A1 * | 11/2013 | Weber | H02J 2207/40 320/109 |
| 2014/0183876 | A1 * | 7/2014 | Yamashita | F02N 11/0862 290/36 R |
| 2014/0191705 | A1 | 7/2014 | Takao et al. | |
| 2014/0203634 | A1 * | 7/2014 | Sugiyama | B60L 7/14 307/10.1 |
| 2014/0343877 | A1 * | 11/2014 | Kimura | H02J 7/0068 702/63 |
| 2015/0042160 | A1 * | 2/2015 | Matsuda | B60L 53/305 307/10.3 |
| 2015/0046107 | A1 * | 2/2015 | Jo | G01R 31/3648 702/63 |
| 2015/0145476 | A1 | 5/2015 | Toya | |
| 2015/0323945 | A1 * | 11/2015 | Perier | G05F 1/46 307/31 |
| 2016/0064967 | A1 * | 3/2016 | Lee | H02J 7/00711 320/112 |

FOREIGN PATENT DOCUMENTS

| | | | | |
|---|---|---|---|---|
| JP | 3001676 | U | 9/1994 | |
| JP | H7-61391 | A | 3/1995 | |
| JP | H10-42401 | | 2/1998 | |
| JP | H10-295045 | A | 11/1998 | |
| JP | 2001-30974 | A | 2/2001 | |
| JP | 2007-112406 | A | 5/2007 | |
| JP | 2011-166877 | A | 8/2011 | |
| JP | 2011-255841 | A | 12/2011 | |
| JP | 2012-29503 | A | 2/2012 | |
| JP | 2012-244715 | A | 12/2012 | |
| JP | 2013051797 | A * | 3/2013 | ............ H02J 7/0072 |
| JP | 2014-195365 | A | 10/2014 | |
| JP | 2014-240258 | A | 12/2014 | |
| WO | WO-2014157508 | A1 * | 10/2014 | ............ B60L 7/12 |

OTHER PUBLICATIONS

English translation of Written Opinion (PCT/ISA/237) issued in PCT/JP2016/071326 dated Sep. 2016.
International Search Report (ISR) issued in PCT/JP2016/071326 dated Sep. 2016.
Written Opinion (PCT/ISA/237) issued in PCT/JP2016/071326 dated Sep. 2016. (Concise Explanation of Relevance: This Written Opinion considers that the some of claims are described by or obvious over the Foreign Patent Document Nos. 1 and 3-5).
Japanese Office Action dated Jun. 13, 2017, in a counterpart Japanese patent application No. 2015-165593. (A machine translation (not reviewed for accuracy) attached.).
Chinese Office Action dated Jun. 18, 2020, issued to Chinese Application No. 201680048877.5.

* cited by examiner (a)

(b)

CONTROL APPARATUS, ELECTRICAL POWER STORAGE APPARATUS AND SYSTEM FOR MOBILE OBJECT

TECHNICAL FIELD

This invention relates to a control apparatus for controlling charge of an electrical power storage device such as a battery, a control apparatus for controlling discharge of the electrical power storage device, an electrical power storage apparatus including the control apparatus and a system for a mobile object, which includes the electrical power storage apparatus.

BACKGROUND TECHNOLOGY

The conventional electrically assisted bicycle has a detachable battery pack. Such a battery pack may have enough power supply capability to keep output of several tens watt class for several hours. Moreover, when charging such a battery pack, a dedicated battery charger is used, in general. In other words, typically, the battery pack is charged by putting the battery pack on the battery charger, which is connected with an outlet, after the battery pack is detached from the electrically assisted bicycle.

On the other hand, there is a case where a regeneration function is equipped with the electrically assisted bicycle to charge the battery when running down a hill, for example. However, there is no supposition where the battery is charged by any method other than the regeneration function, during running. Furthermore, there is also no supposition where the power is supplied to another device when performing the assisted running.

PRIOR TECHNICAL DOCUMENTS

Patent Documents

Patent Document 1: US Publication No. 2015/0145476A1
Patent Document 2: US Publication No. 2014/0191705A1

SUMMARY OF THE INVENTION

Object to be Solved by the Invention

Therefore, as one aspect, an object of this invention is to provide a technique for enabling to appropriately charge an electrical power storage device by another apparatus even during the regeneration.

Furthermore, as one aspect, a different object of this invention is to provide a technique for enabling to appropriately perform electrical power supply to another apparatus during electrical power supply to a power unit for assisting a human power.

Means for Solving the Problem

A control apparatus relating to a first aspect of this invention includes: (A) a first connecting part, which is connected with a driving control apparatus for controlling driving of a power unit for assisting a human power or with the power unit, and through which a current relating to charging or discharging of an electrical power storage device flows; (B) a second connecting part, which is provided separately from the first connecting part, and through which a current relating to charging to the electrical power storage device flows by an electrical connection; and (C) a controller configured to control charging and discharging of the electrical power storage device, which are performed by using a current, which flows in the first connecting part and/or the second connecting part.

A control apparatus relating to a second aspect of this invention has (A) a first connecting part, which is connected with a driving control apparatus for controlling driving of a power unit for assisting a human power or with the power unit, and through which a current relating to charging and discharging of an electrical power storage device flows; (B) a second connecting part, which is provided separately from the first connecting part, and through which a current relating to discharging of the electrical power storage device flows via an electrical connection; and (C) a controller to control charging and discharging of the electrical power storage device, which are performed by using a current, which flows in the first connecting part and/or the second connecting part.

Effect of the Invention

As one aspect, it becomes possible to appropriately charge the electrical power storage device by another apparatus even during the regeneration.

As another aspect, it becomes possible to appropriately supply the electrical power to another apparatus during the electrical power supply to the power device for assisting the human power.

Figure 3:
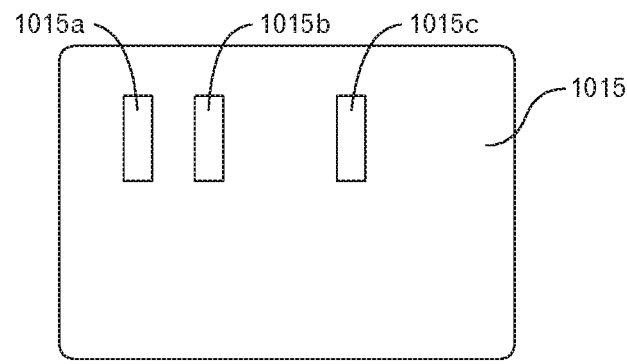
Figure 3:
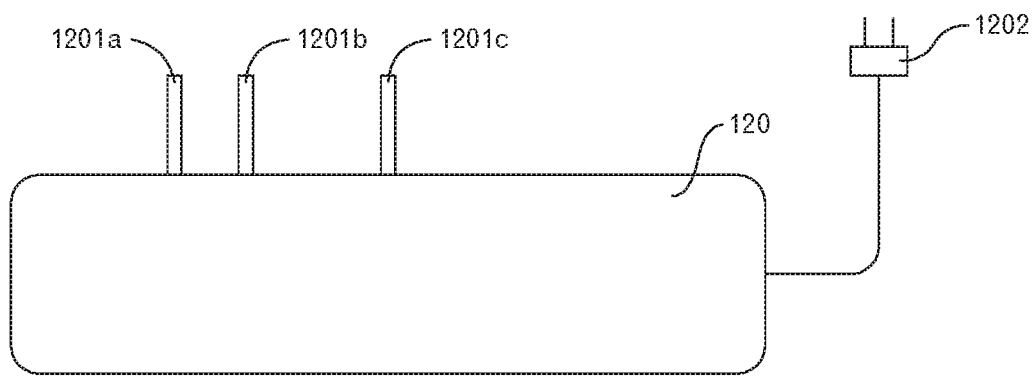
Figure 4:
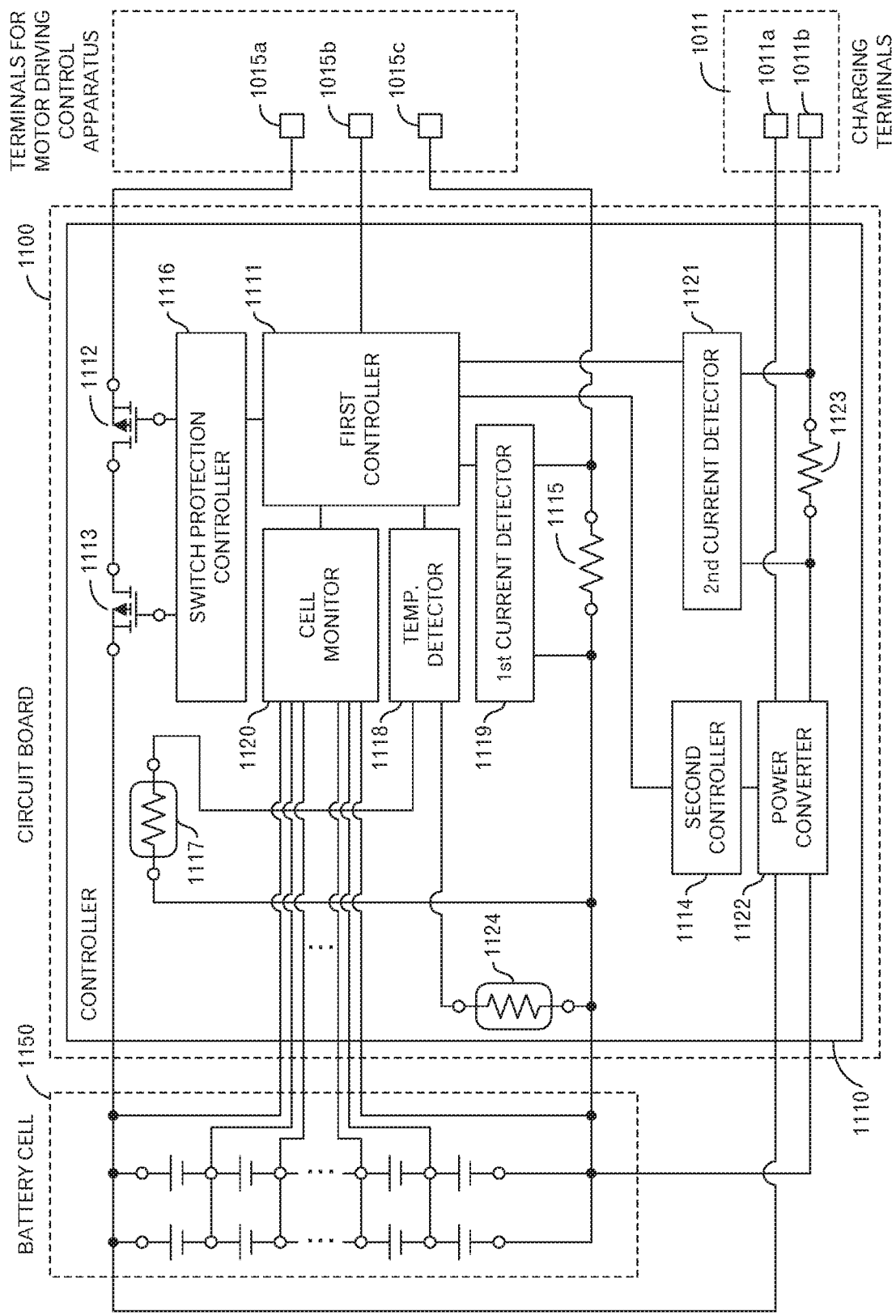
Figure 5:
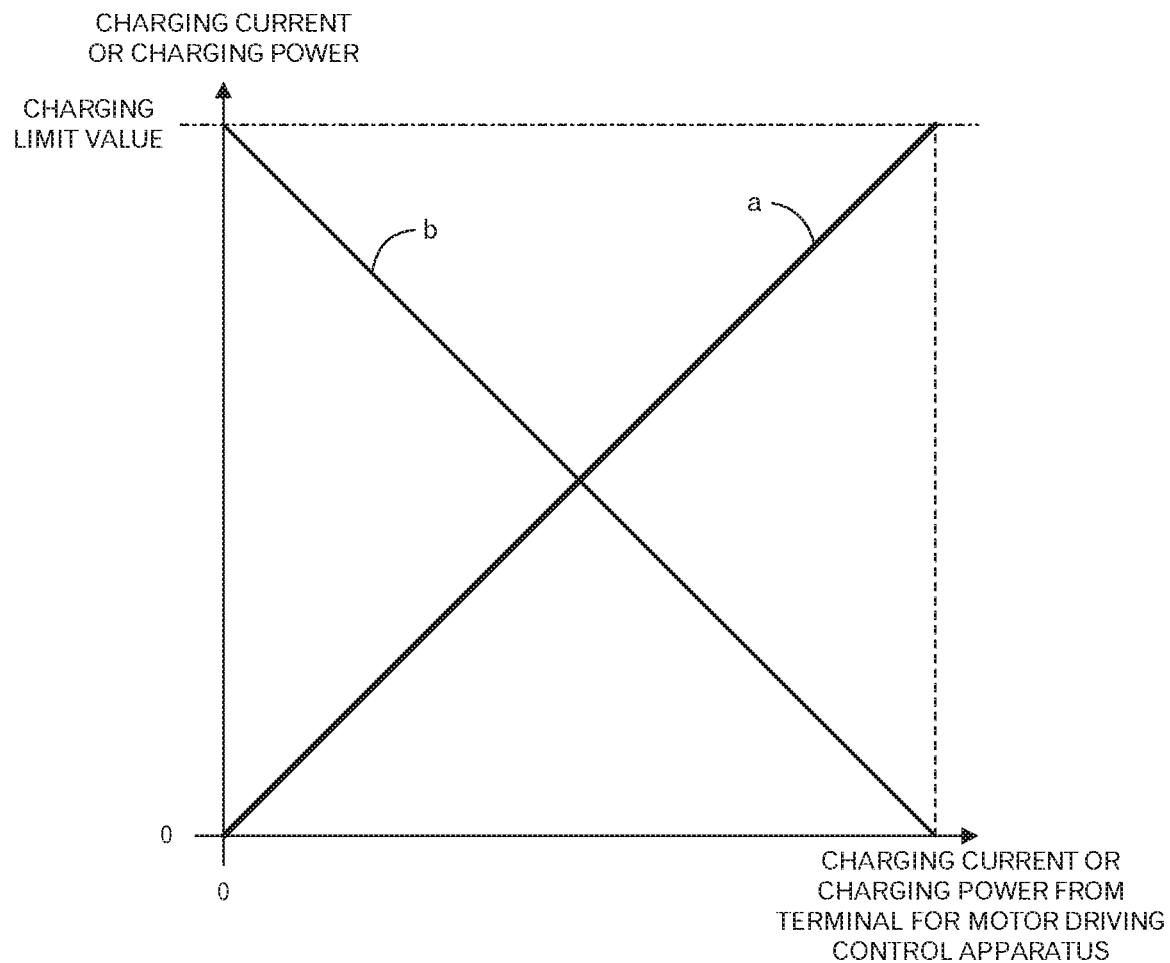
Figure 6:
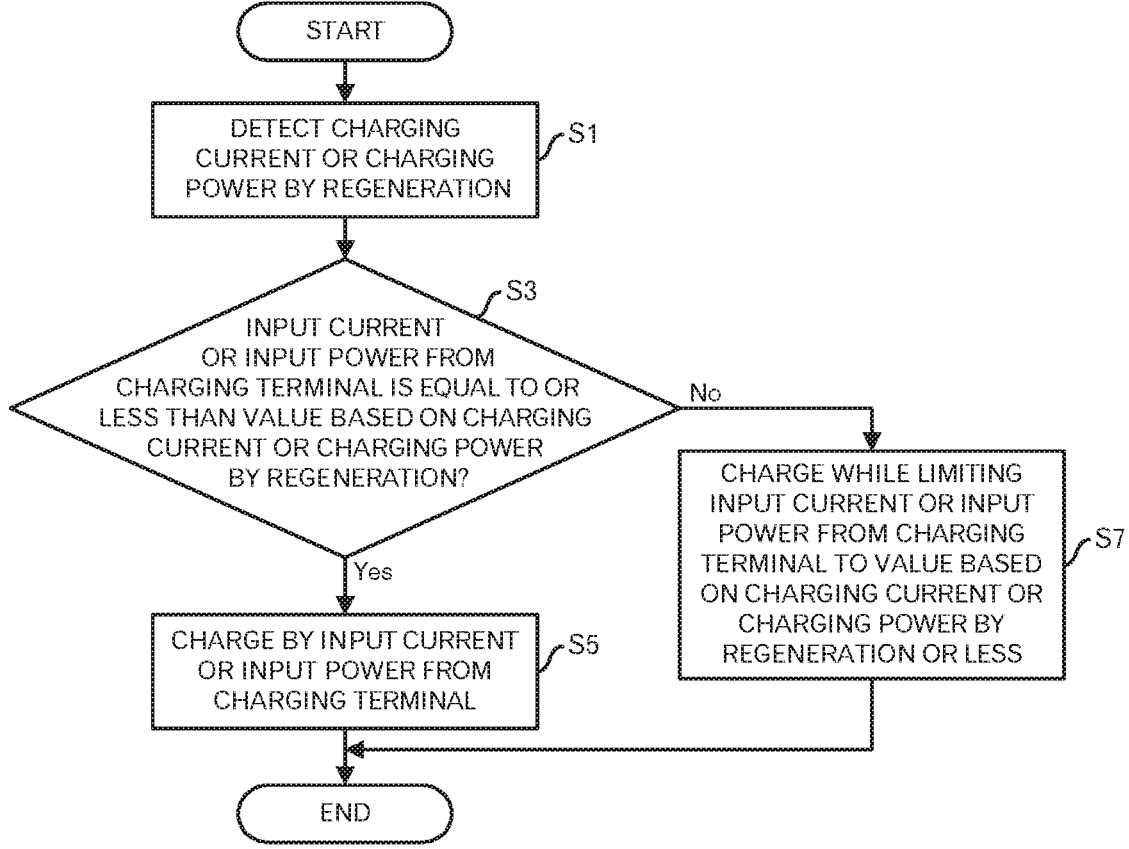
Figure 7A:
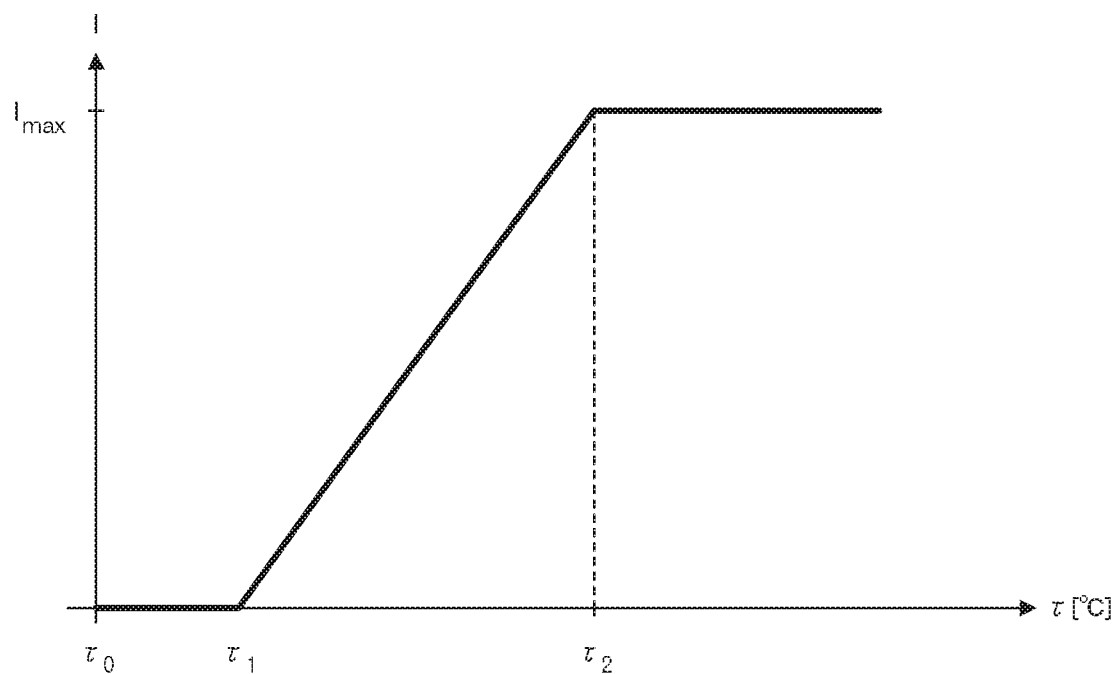
Figure 7B:
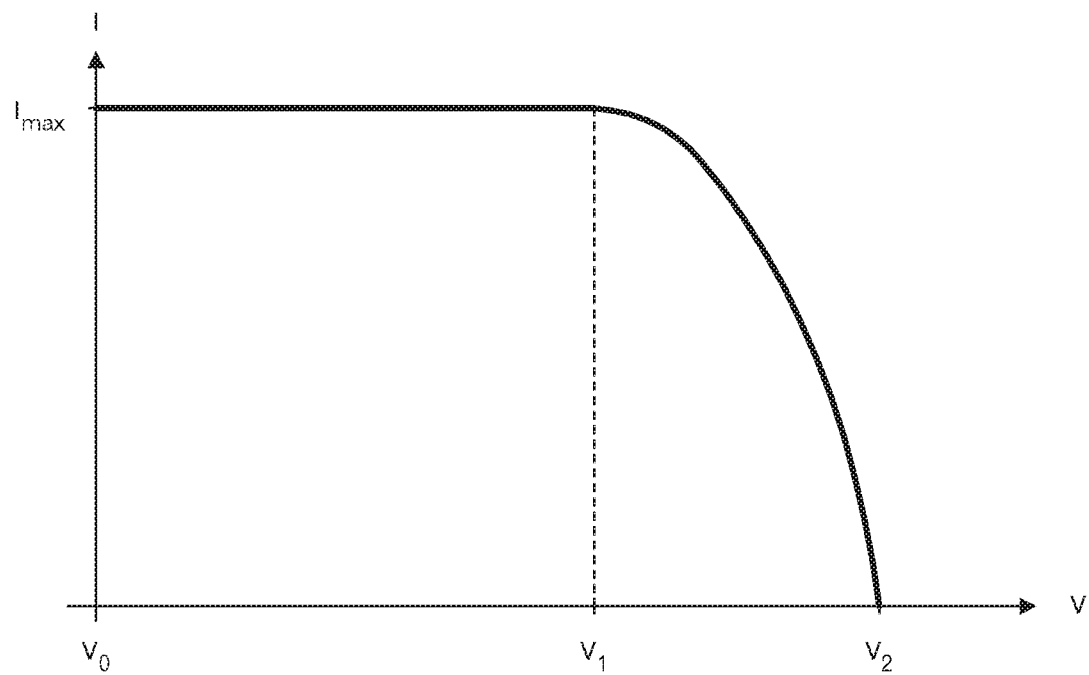
Figure 8:
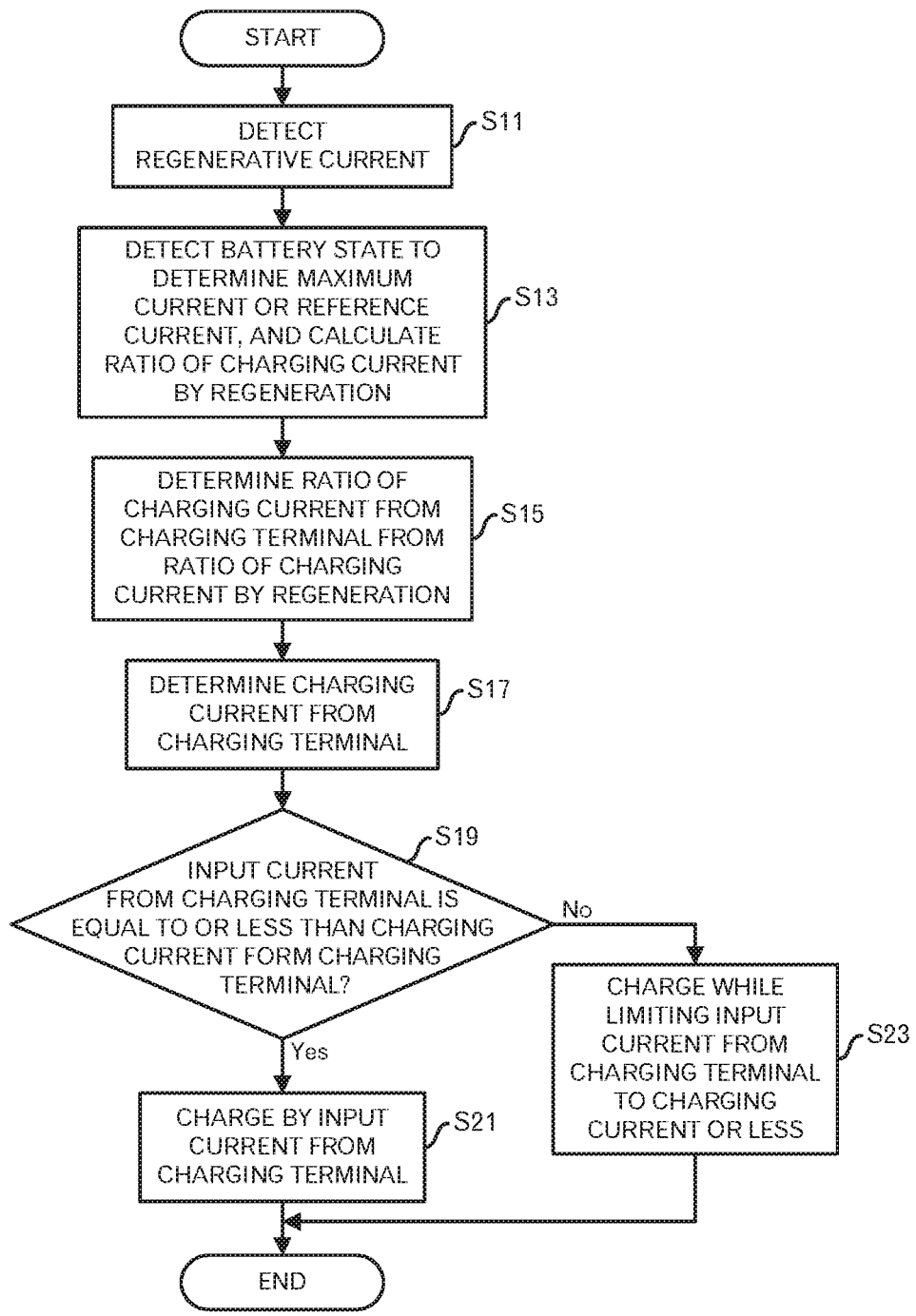
Figure 9:
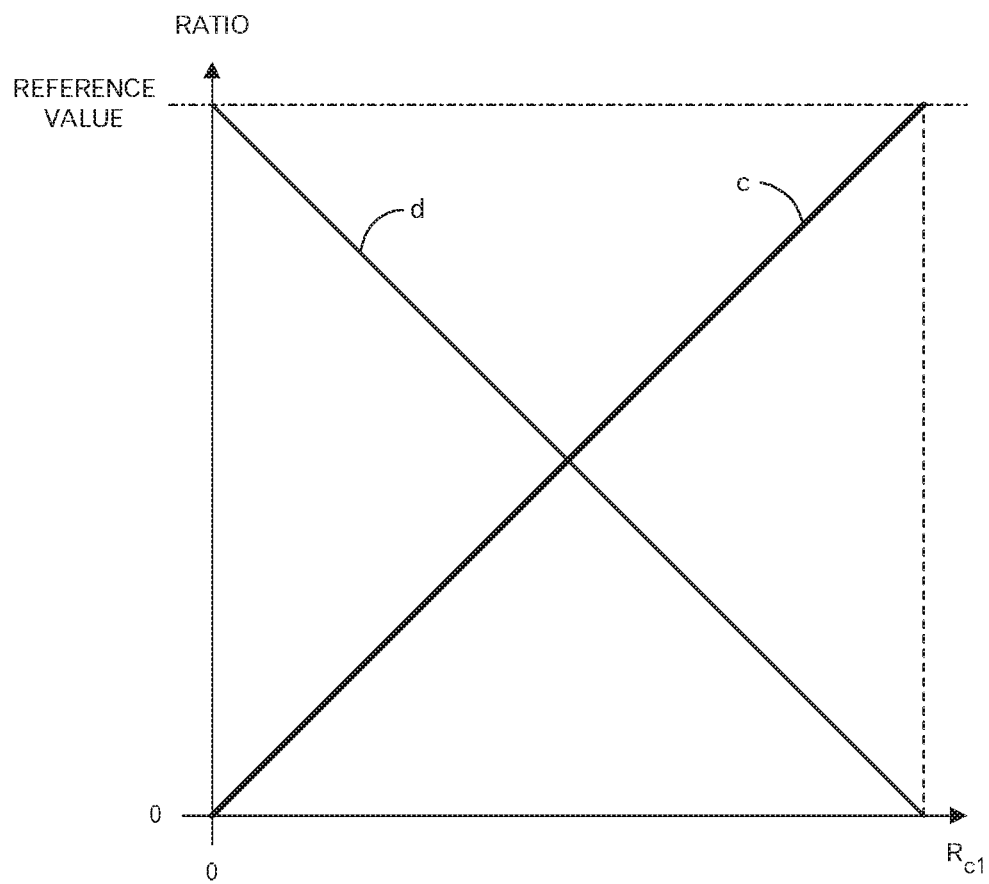
Figures 10, 11:
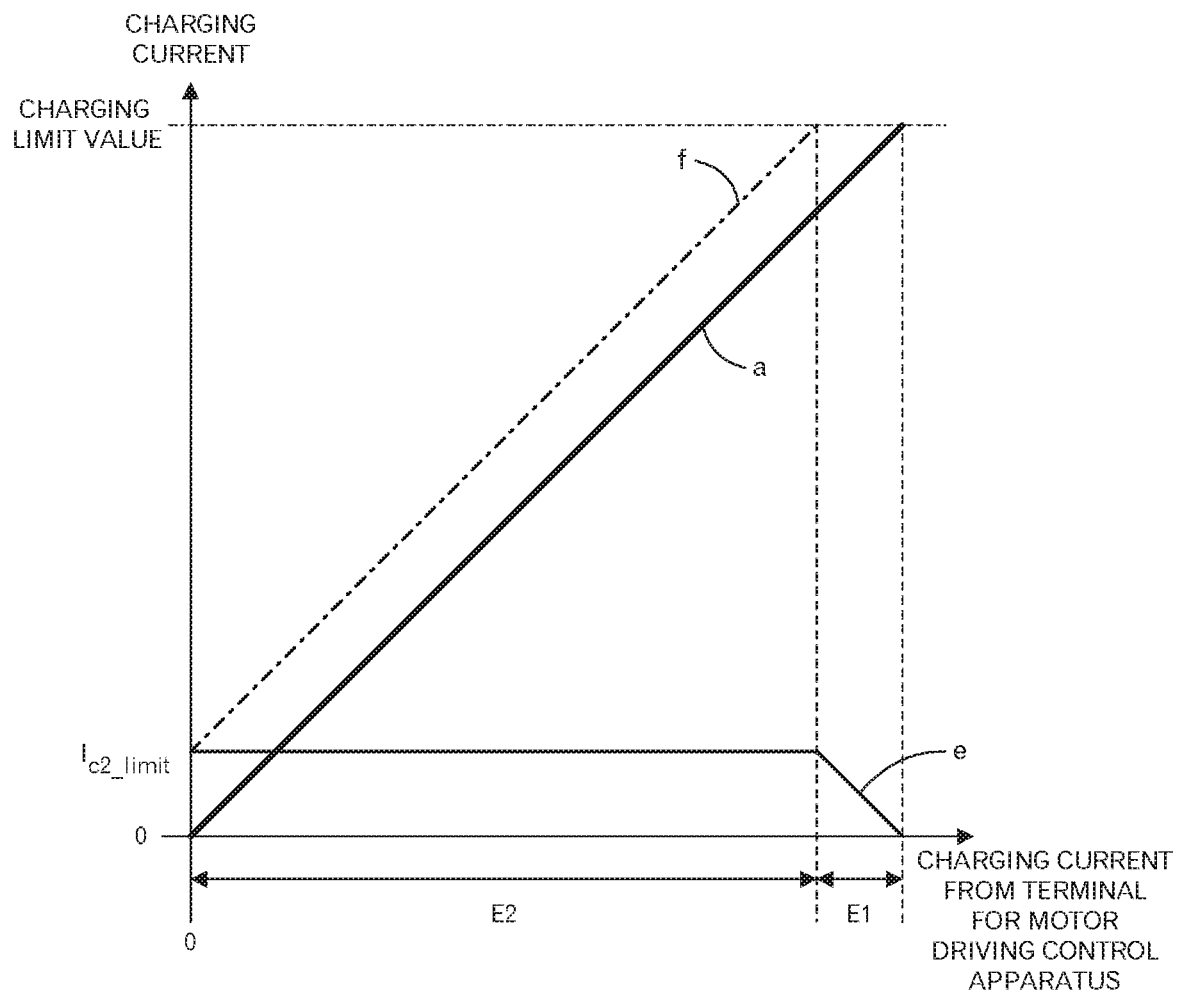
Figure 12:
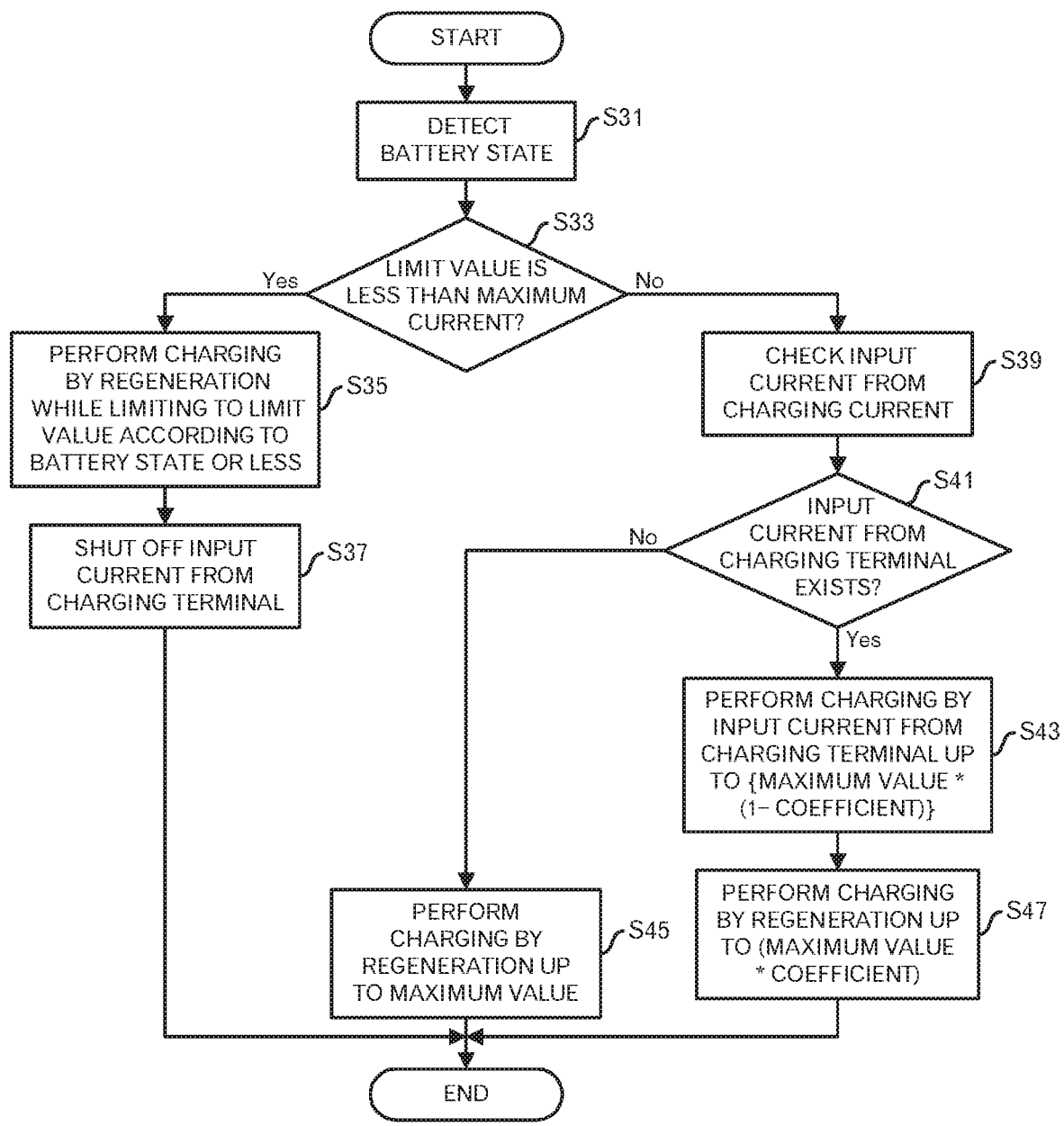
Figure 13:
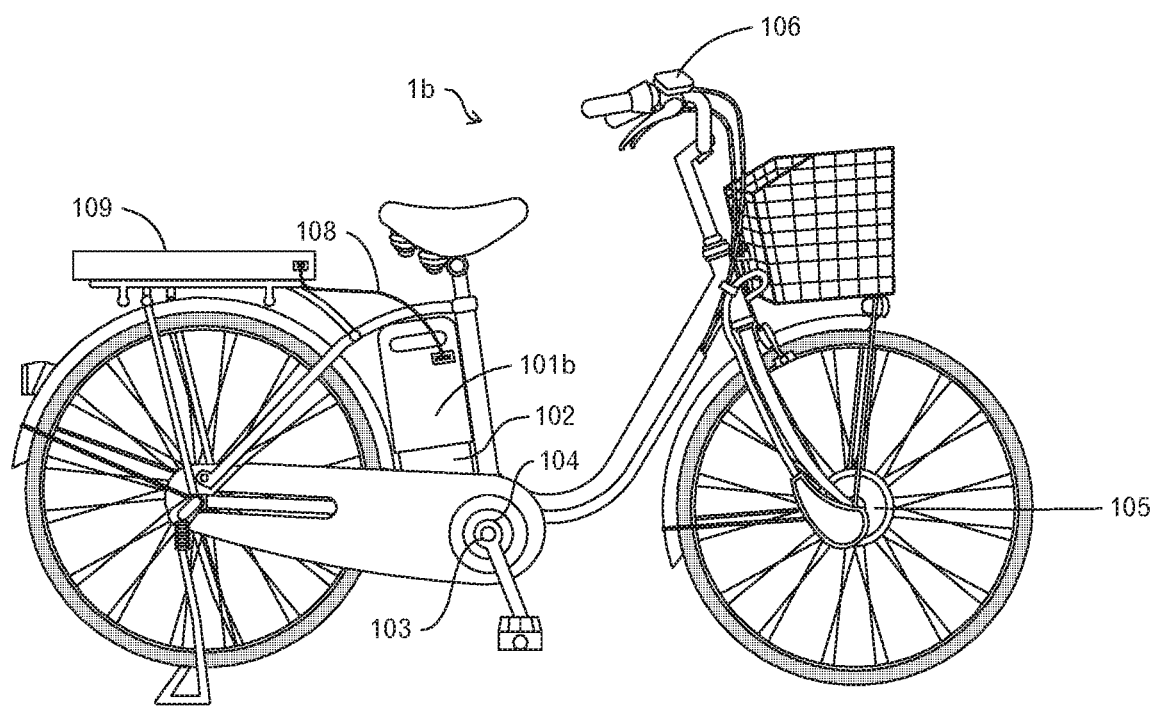
Figure 14:
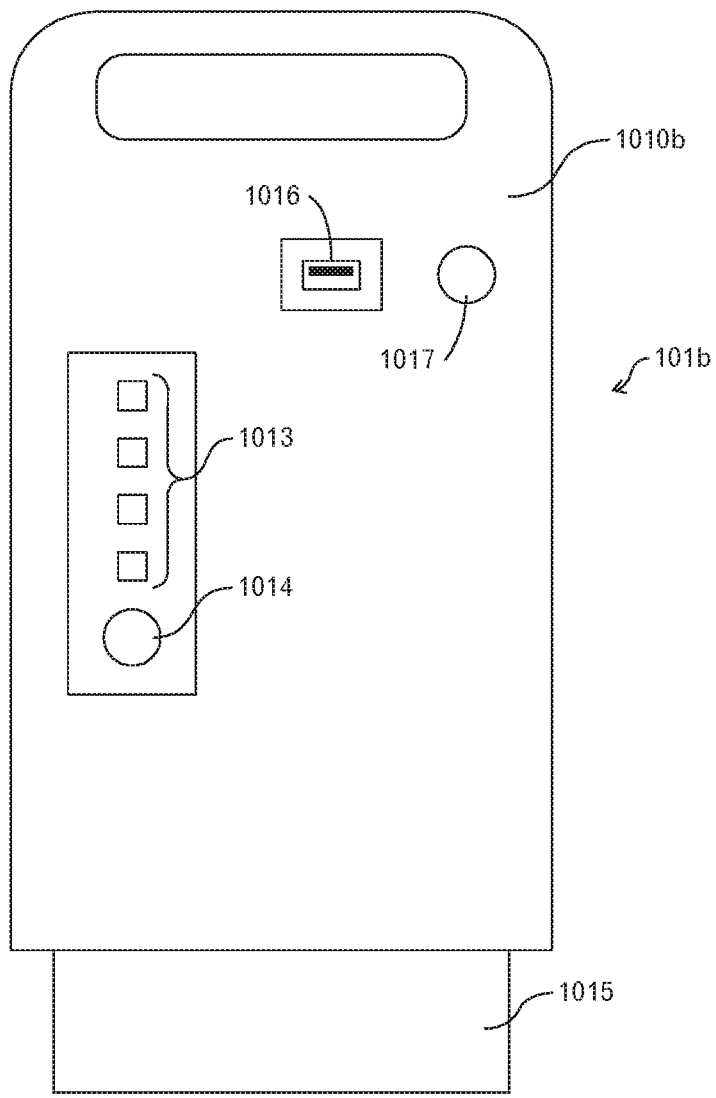
Figure 15:
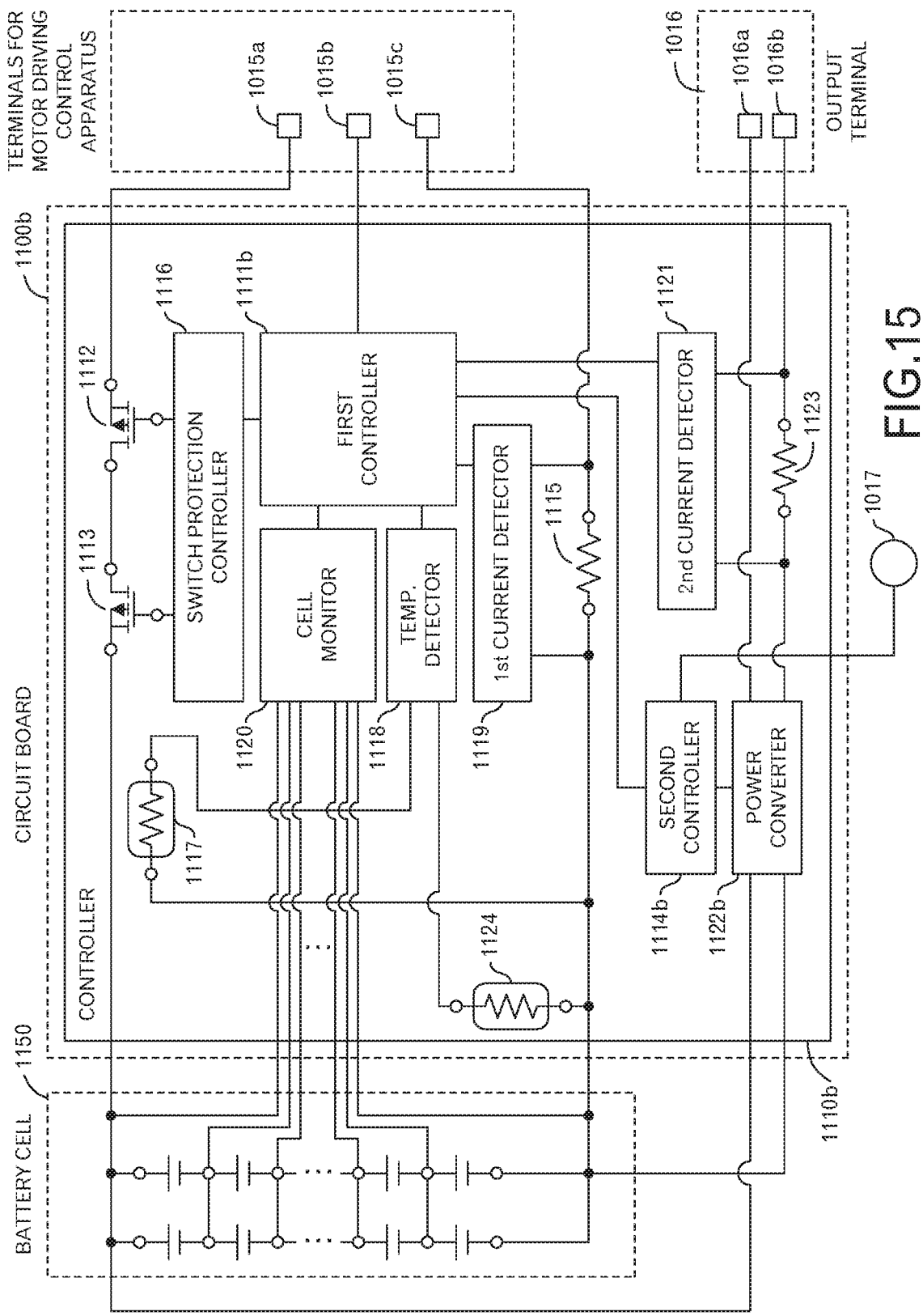
Figure 16A:
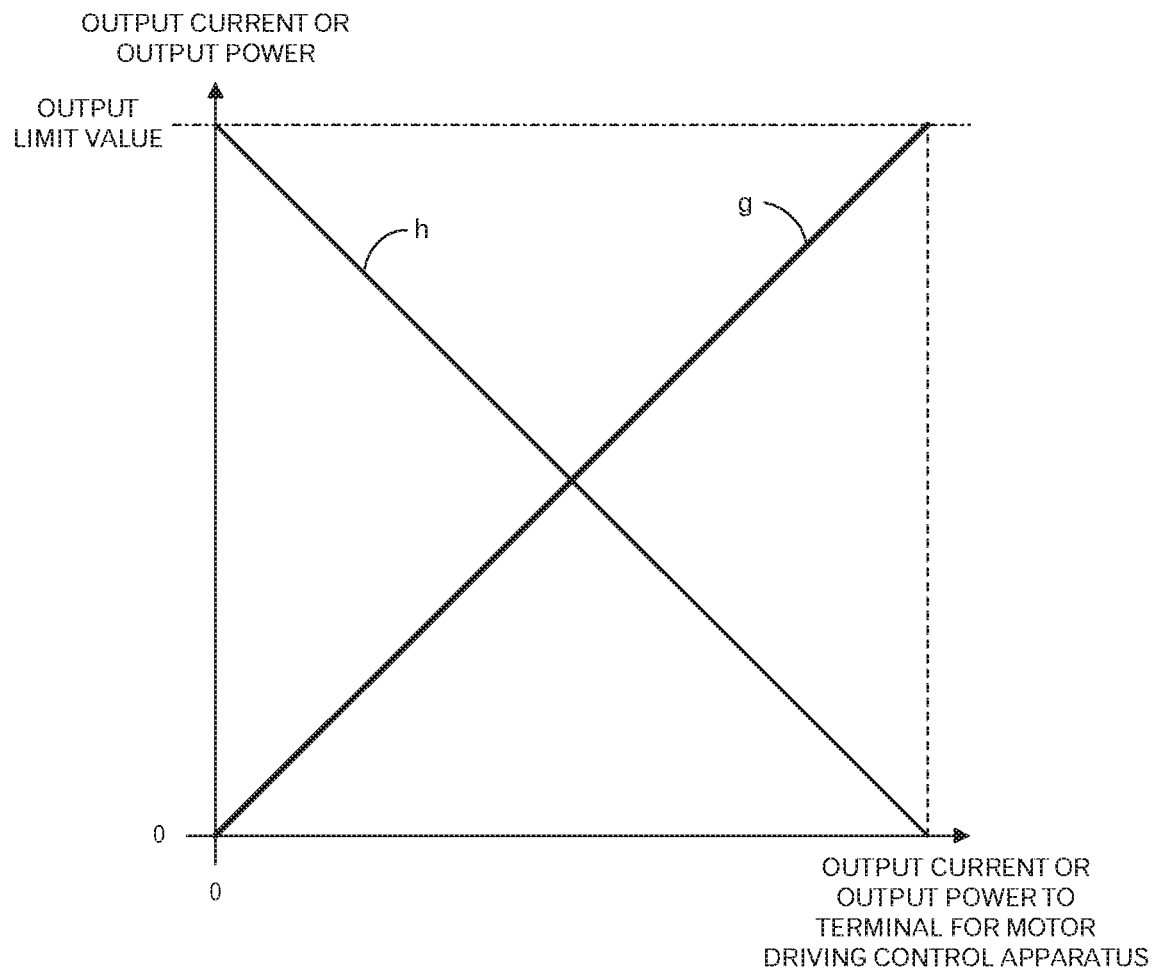
Figure 16B:
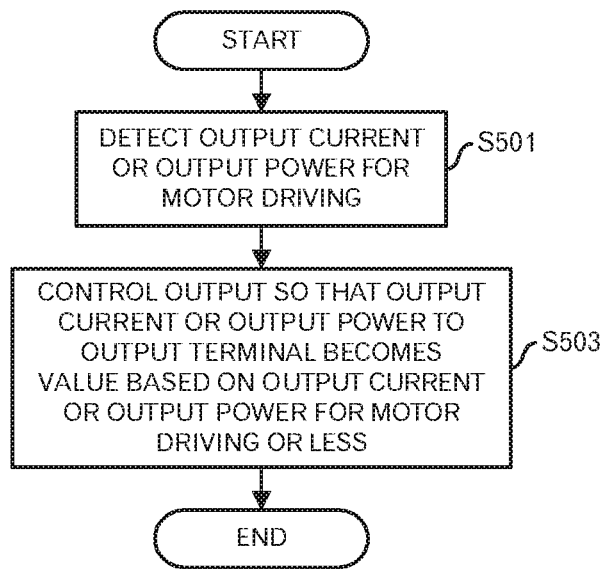
Figure 17A:
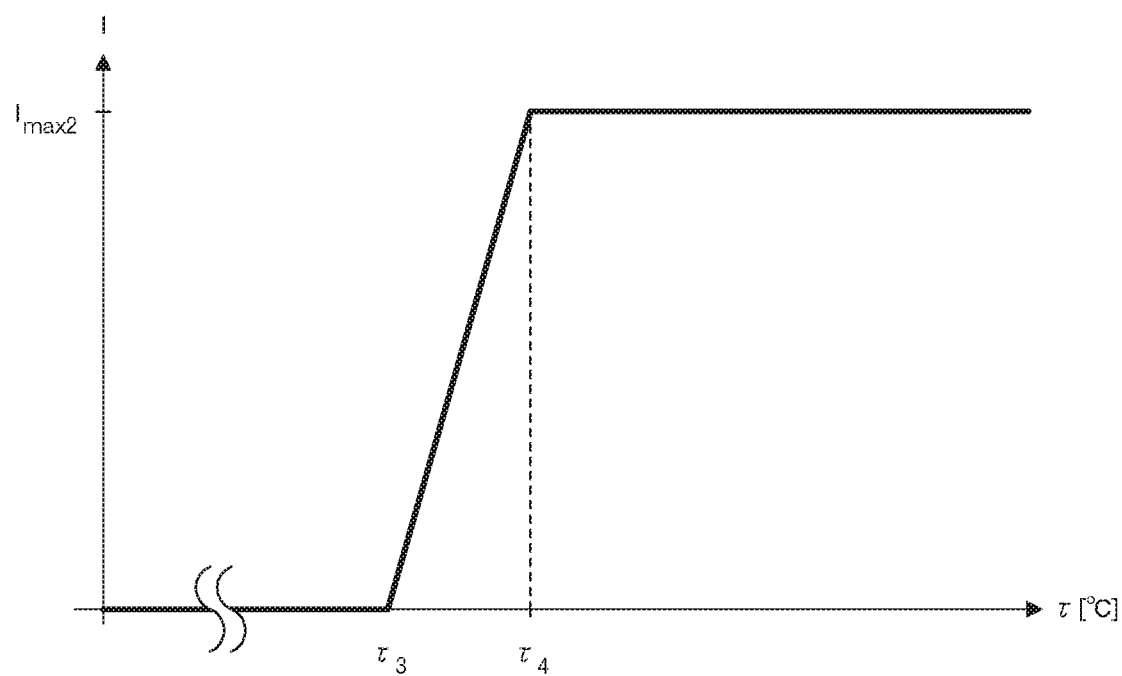
Figure 17B:
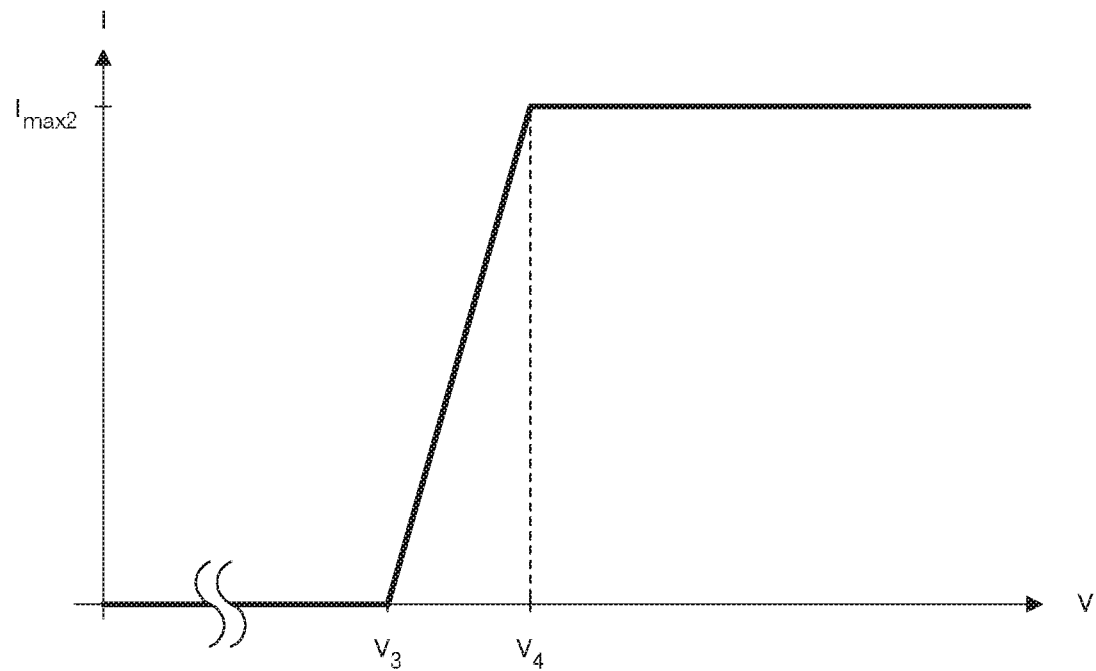
Figure 18:
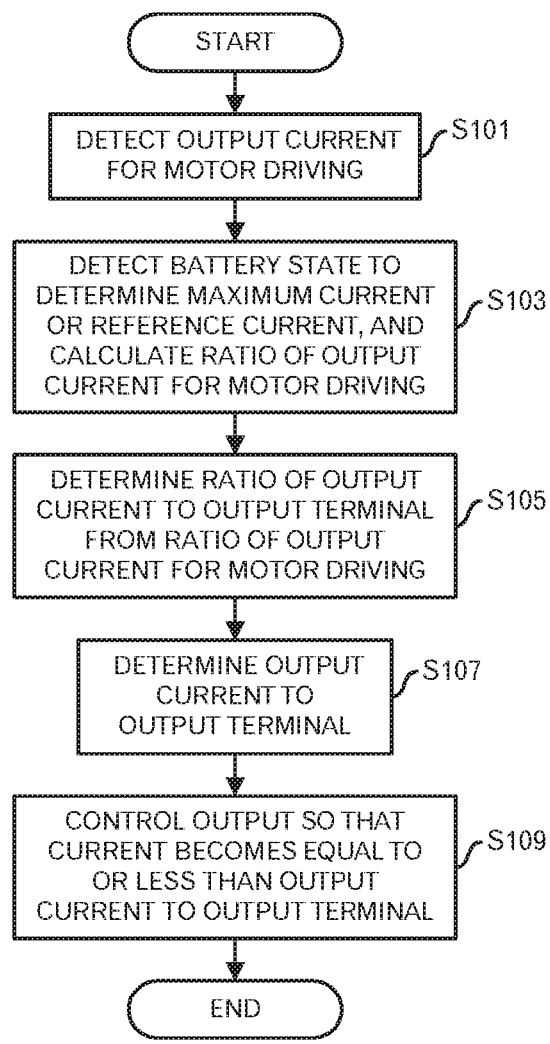
Figure 19:
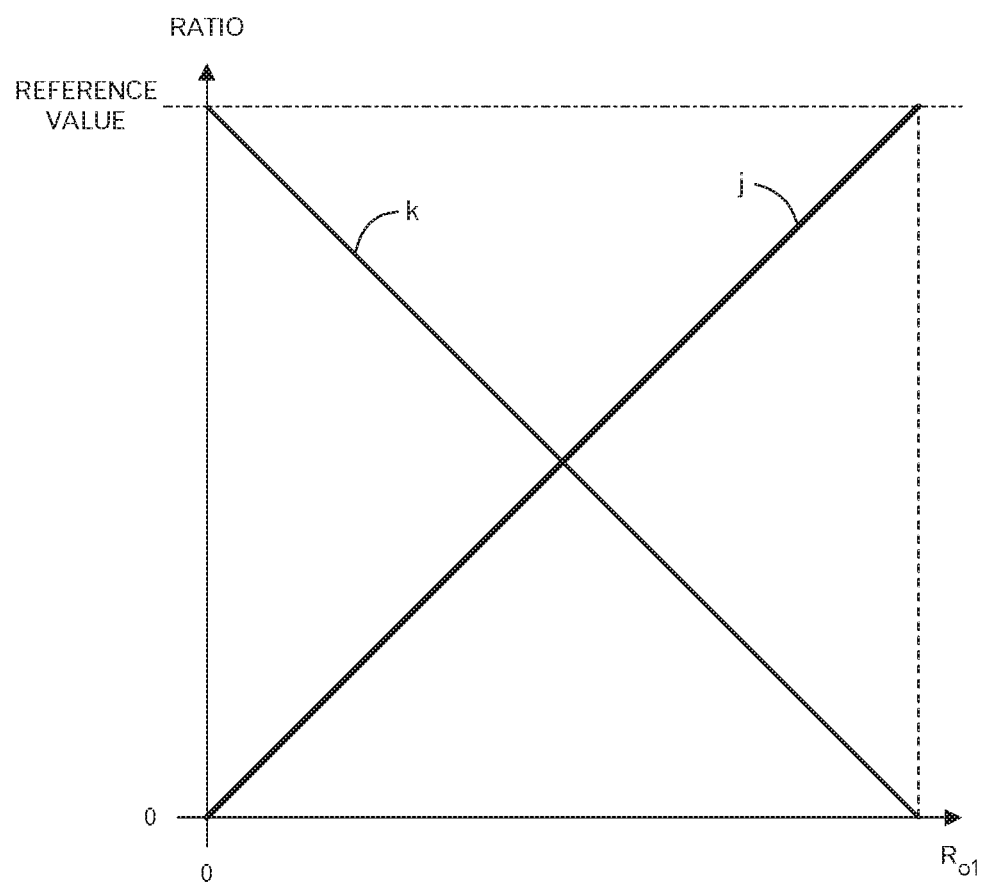
Figures 20, 21:
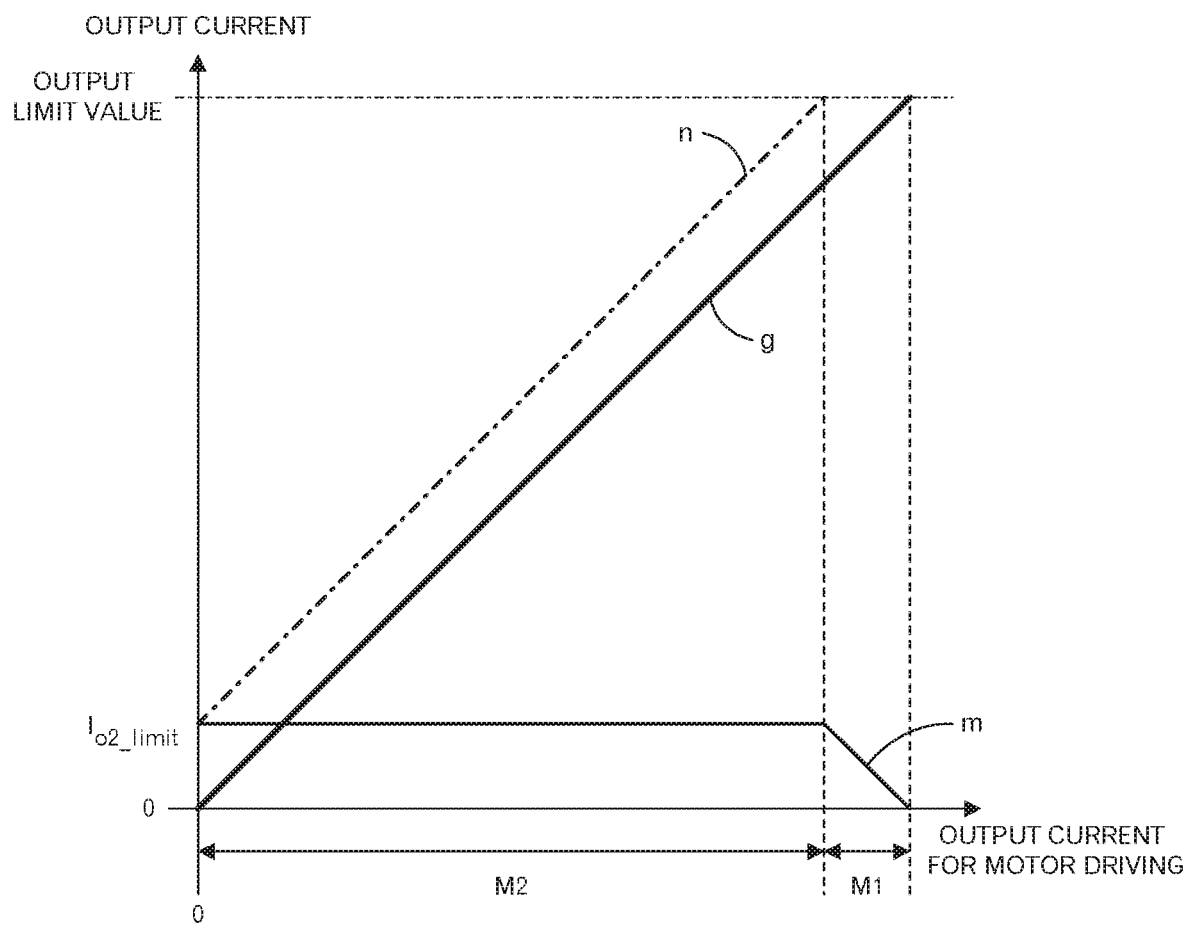
Figure 22:
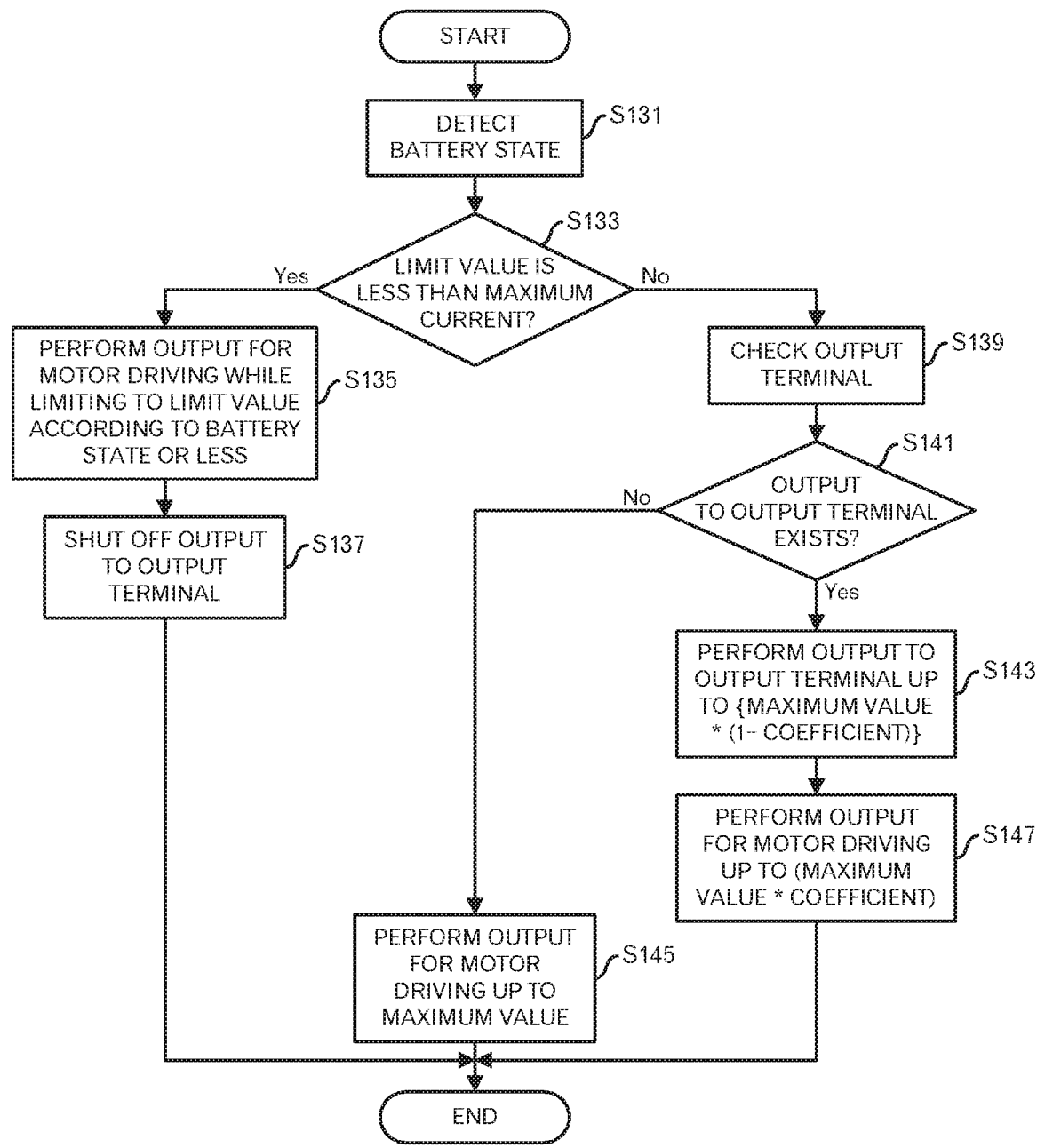
Figure 23:
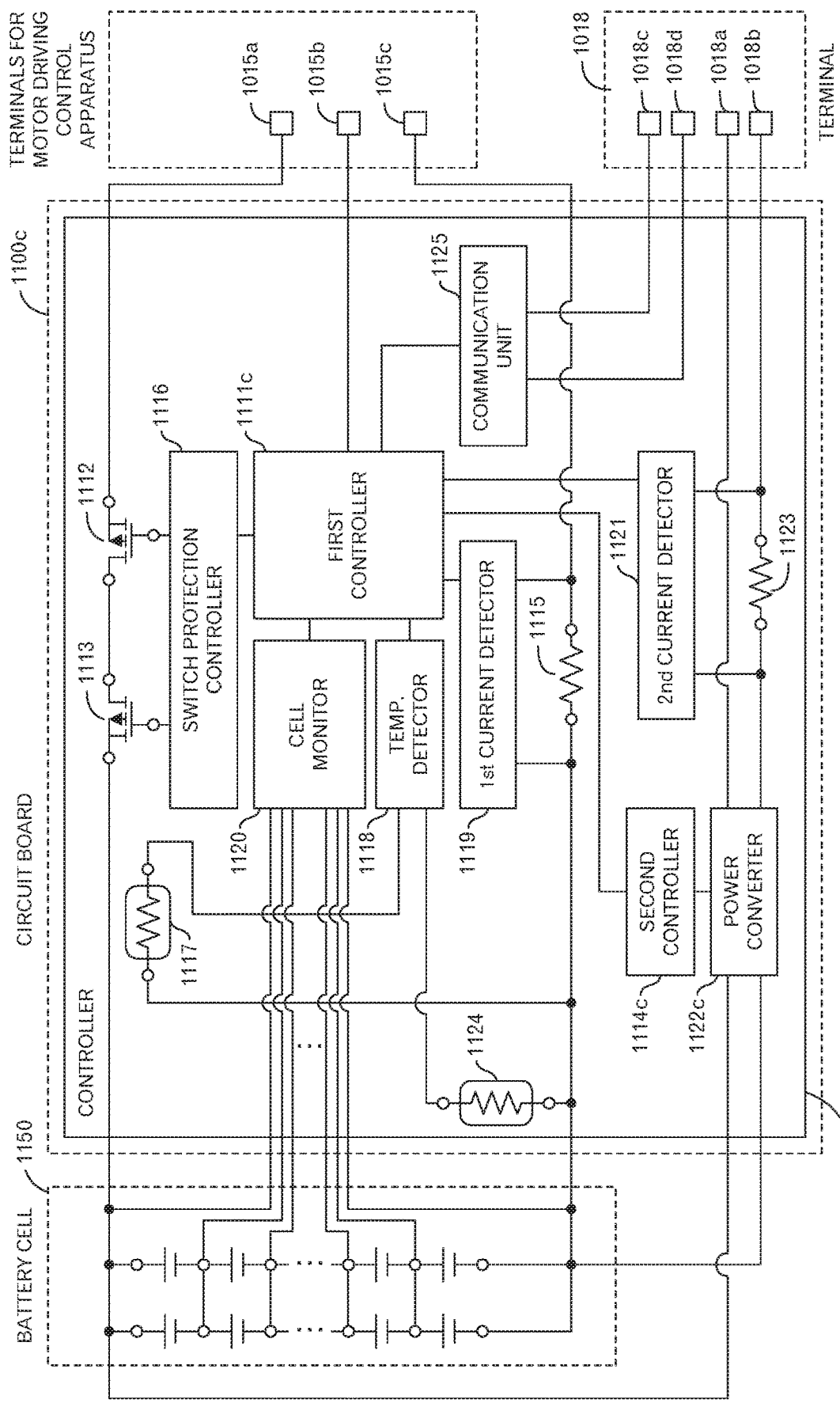
Figure 24:
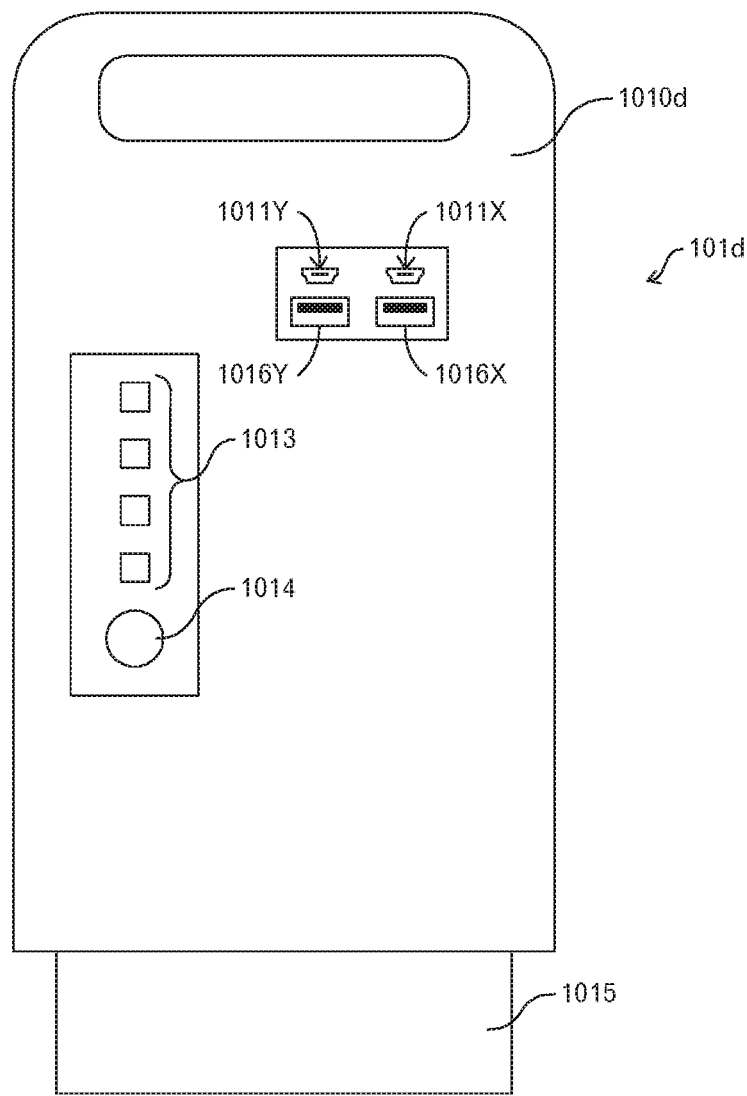
Figure 25A:
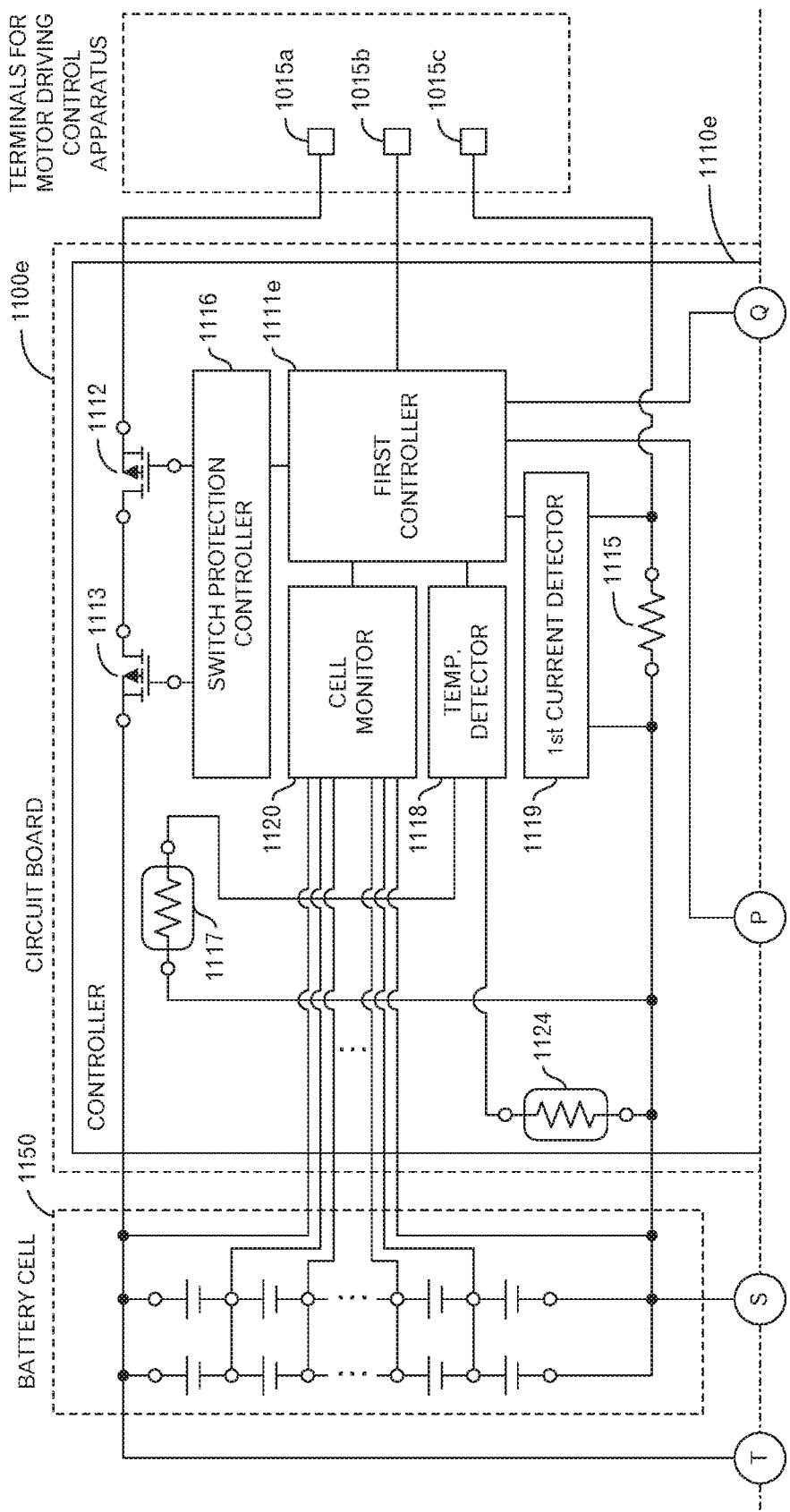
Figure 25B:
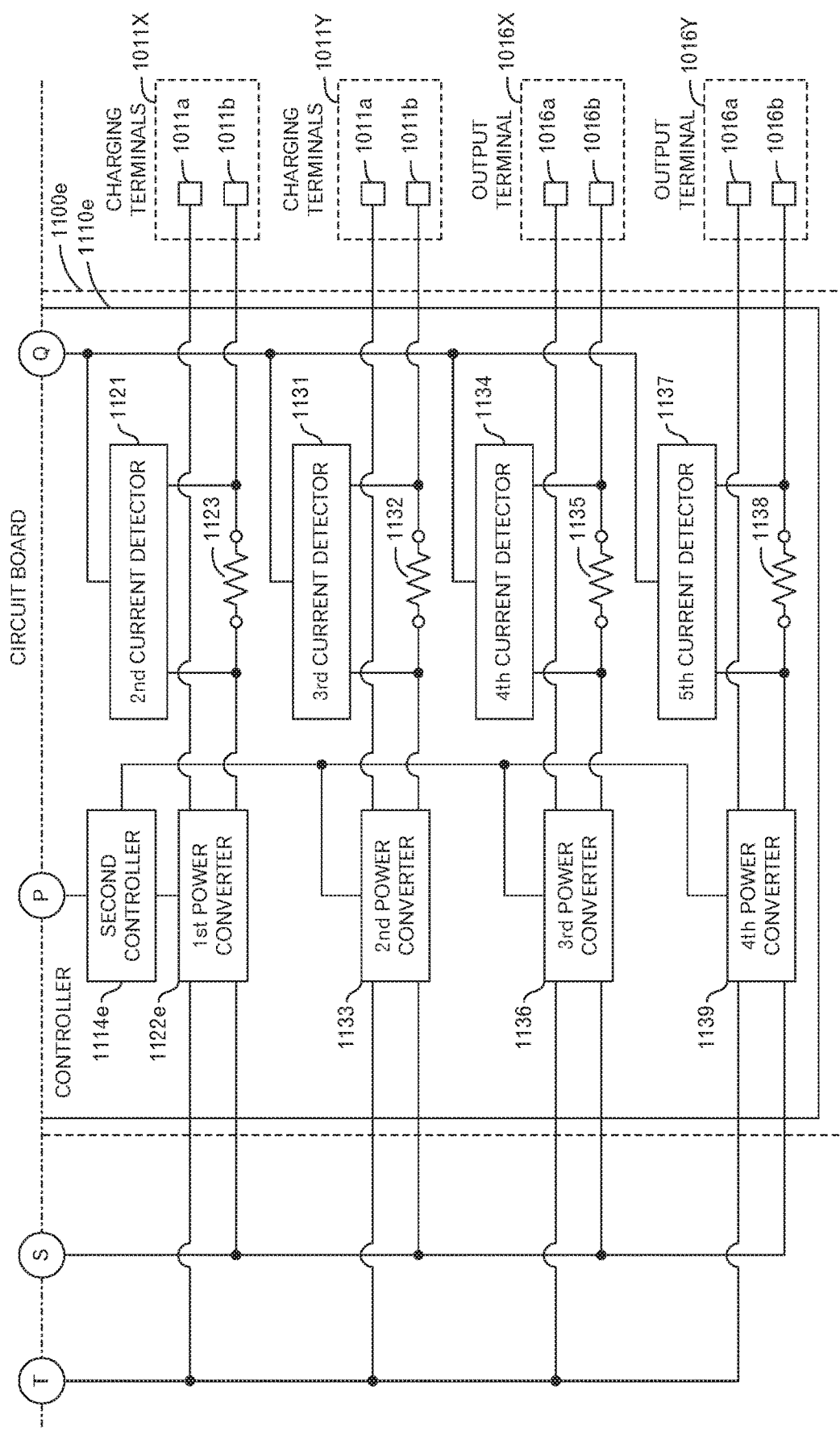
Figure 26:
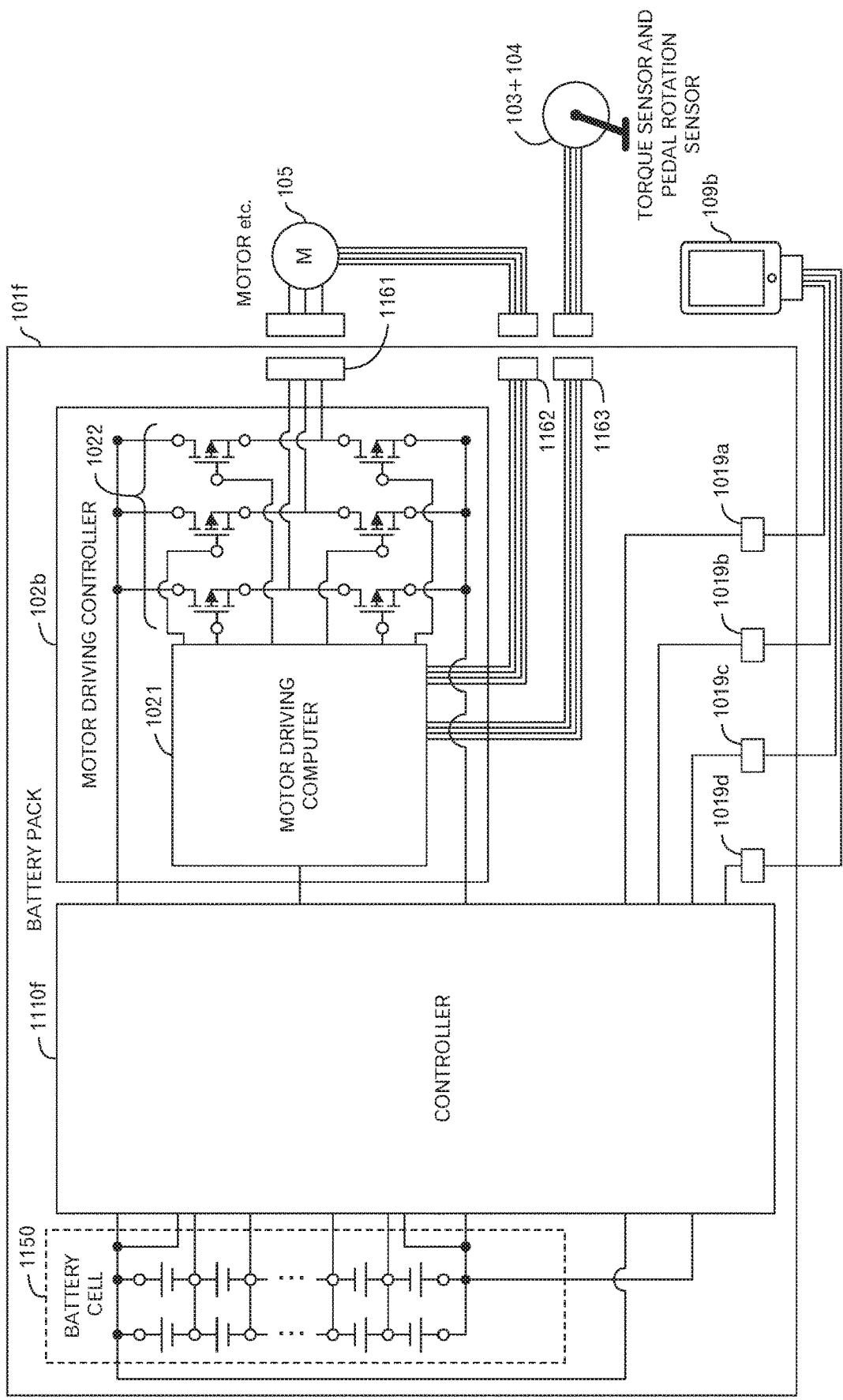
Figure 27:
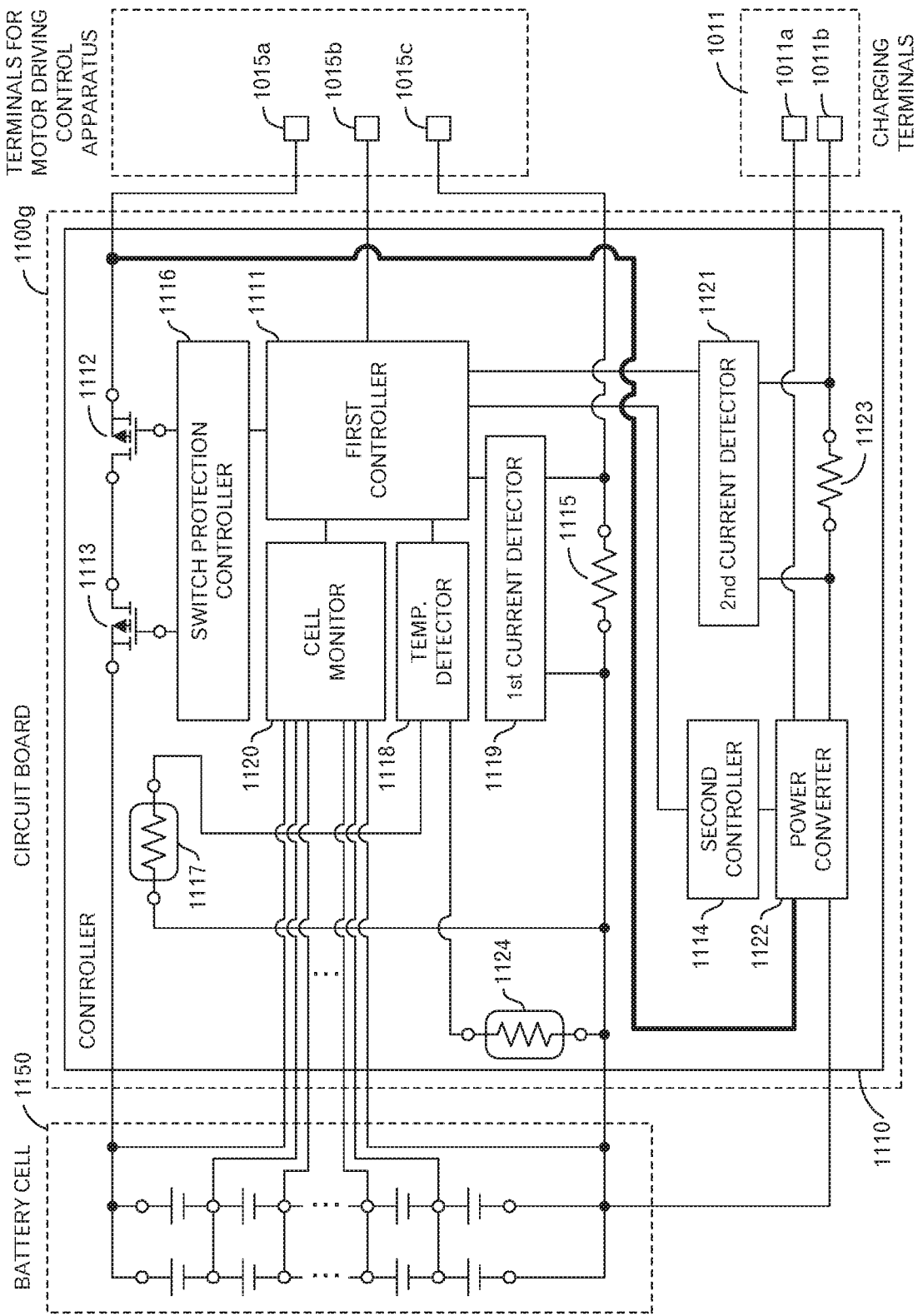
Figure 28:
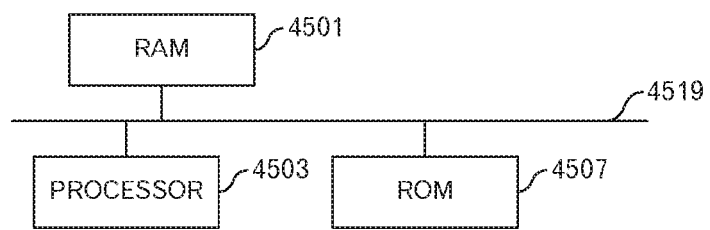

(a) of FIG. 3 is a bottom view of the battery pack, and (b) of FIG. 3 is an external view of a battery charger;

FIG. 4 is a functional block diagram of the battery pack relating to the first embodiment;

FIG. 5 is a diagram to explain a first example of charging control in the first embodiment;

FIG. 6 is a diagram to explain the first example of the charging control in the first embodiment;

FIG. 7A is a diagram to explain changes of a limit value of a charging current according to the temperature;

FIG. 7B is a diagram to explain changes of the limit value of the charging current according to a battery voltage;

FIG. 8 is a diagram to explain a second example of the charging control in the first embodiment;

FIG. 9 is a diagram to explain the second example of the charging control in the first embodiment;

FIG. 10 is a diagram to explain a third example of the charging control in the first embodiment;

FIG. 11 is a diagram to explain a fourth example of the charging control in the first embodiment;

FIG. 12 is a diagram to explain the fourth example of the charging control in the first embodiment;

FIG. 13 is an exterior view of an electrically assisted vehicle relating to a second embodiment;

FIG. 14 is an exterior view of a battery pack relating to the second embodiment;

FIG. 15 is a functional block diagram of the battery pack relating to the second embodiment;

FIG. 16A is a diagram to explain a first example of discharging control in the second embodiment;

FIG. 16B is a diagram to explain the first example of the discharging control in the second embodiment;

FIG. 17A is a diagram to explain changes of a limit value of a discharging current according to the temperature;

FIG. 17B is a diagram to explain changes of the limit value of the discharging current according to the battery voltage;

FIG. 18 is a diagram to explain a second example of the discharging control in the second embodiment;

FIG. 19 is a diagram to explain the second example of the discharging control in the second embodiment;

FIG. 20 is a diagram to explain a third example of the discharging control in the second embodiment;

FIG. 21 is a diagram to explain a fourth example of the discharging control in the second embodiment;

FIG. 22 is a diagram to explain the fourth example of the discharging control in the second embodiment;

FIG. 23 is a functional block diagram of a battery pack relating to a third embodiment;

FIG. 24 is an exterior view of a battery pack relating to a fourth embodiment;

FIG. 25A is a functional block diagram of the battery pack relating to the fourth embodiment;

FIG. 25B is a functional block diagram of the battery pack relating to the fourth embodiment;

FIG. 26 is a functional block diagram in case where the motor driving control apparatus is built into the battery pack;

FIG. 27 is a functional block diagram of a battery pack relating to other embodiments; and FIG. 28 is a diagram depicting a configuration example in case where the controller is realized by a processor executing a program.

MODE FOR CARRYING OUT THE INVENTION

In the following, embodiments of this invention will be explained using an example of an electrically assisted bicycle. However, the application target of the embodiment of this invention are not limited to the electrically assisted bicycle, and the embodiments of this invention can be applied to a battery for a motor for assisting movement of a mobile object (e.g. a hand truck, wheelchair, elevator or the like) to move according to the human power. The battery may be combined with the mobile object or may be provided separately from the mobile object.

Embodiment 1

Figure 1:
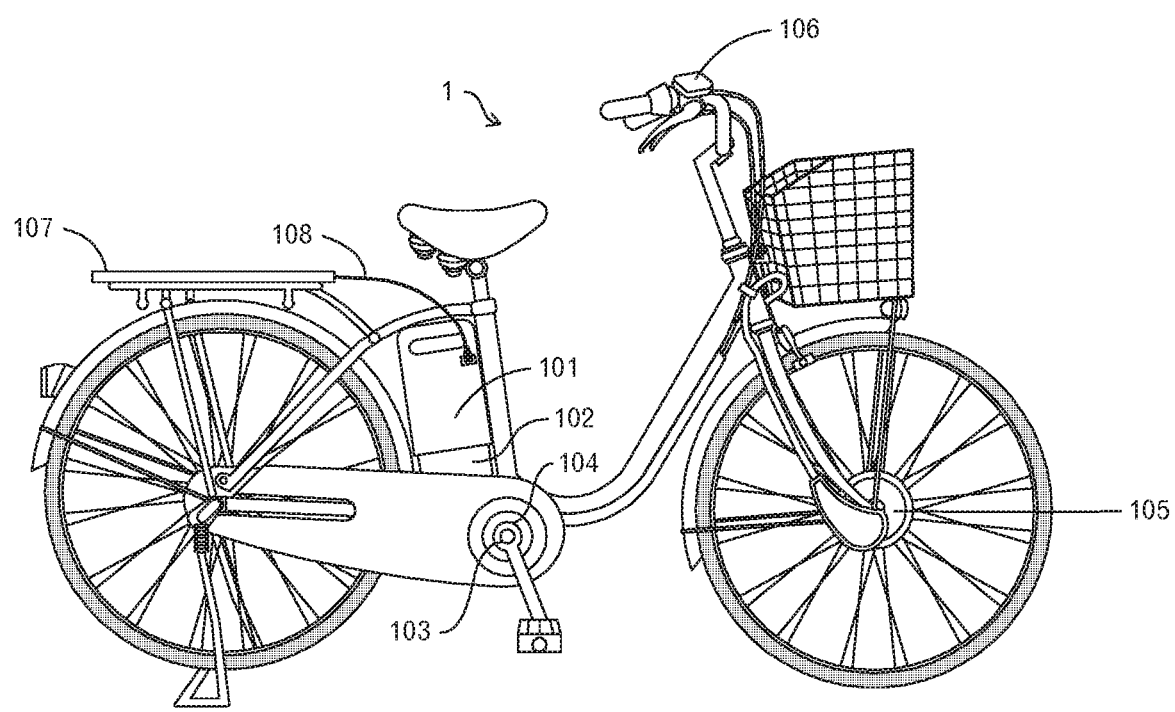
FIG. 1 is an exterior view of an electrically assisted vehicle relating to a first embodiment.

FIG. 1 illustrates an exterior view of the electrically assisted bicycle. The electrically assisted bicycle 1 has a motor driving control apparatus 102, a battery pack 101, a torque sensor 103, a pedal rotation sensor 104, a motor 105, a control panel 106, a solar photovoltaic device 107, and a cable 108. The electrically assisted bicycle 1 also has a freewheel and transmission.

The battery pack 101 includes, for example, a lithium ion secondary battery, a lithium ion polymer secondary battery, a nickel-metal hydride chargeable battery or the like, supplies the electrical power to the motor 105 via the motor driving control apparatus 102, and performs charging by the regenerative power from the motor 105 via the motor driving control apparatus 102 in the regeneration. Furthermore, a new terminal is provided for the battery pack 101, and the battery pack 101 is connected with the solar photovoltaic device 107 through the cable 108, which is connected with that terminal. Here, an example is depicted in which the battery pack 101 is connected to the solar photovoltaic device 107, however, an energy harvest device such as a wind power generator may be connected. In addition, the installation position of the solar photovoltaic device 107 is not limited to the rear platform, and may be another position.

The torque sensor 103 is provided on a wheel, which is installed in the crankshaft, detects a pedal force from the driver, and outputs this detection result to the motor driving control apparatus 102. Similarly to the torque sensor 103, the pedal rotation sensor 104 is provided in the wheel, which is installed on the crankshaft, and outputs pulse signals according to the rotation to the motor driving control apparatus 102.

The motor 105 is, for example, a well-known three-phase direct current brushless motor, and mounted on the front wheel of the electrically assisted bicycle 1. The motor 105 rotates the front wheel, and also a rotor is connected directly or via a reducer to the front wheel so as to rotate according to the rotation of the front wheel. Furthermore, the motor 105 is equipped with a rotation sensor such as a hall effect sensor to output rotation information of the rotor (i.e. a hall signal) to the motor driving control apparatus 102.

The control panel 106 accepts, from a user, an instruction input regarding whether or not the assist should be performed, for example, and an input of a desired assist ratio or the like if the assist should be performed, and outputs the instruction input and the like to the motor driving control apparatus 102. In addition, the control panel 106 may have a function to display data that is a result of the calculation by the motor driving control apparatus 102 such as a travelling distance, a travelling time, a consumed calorie, an amount of regenerative electrical power.

In the following, a configuration of the battery pack 101 relating to this embodiment will be explained.

Figure 2:
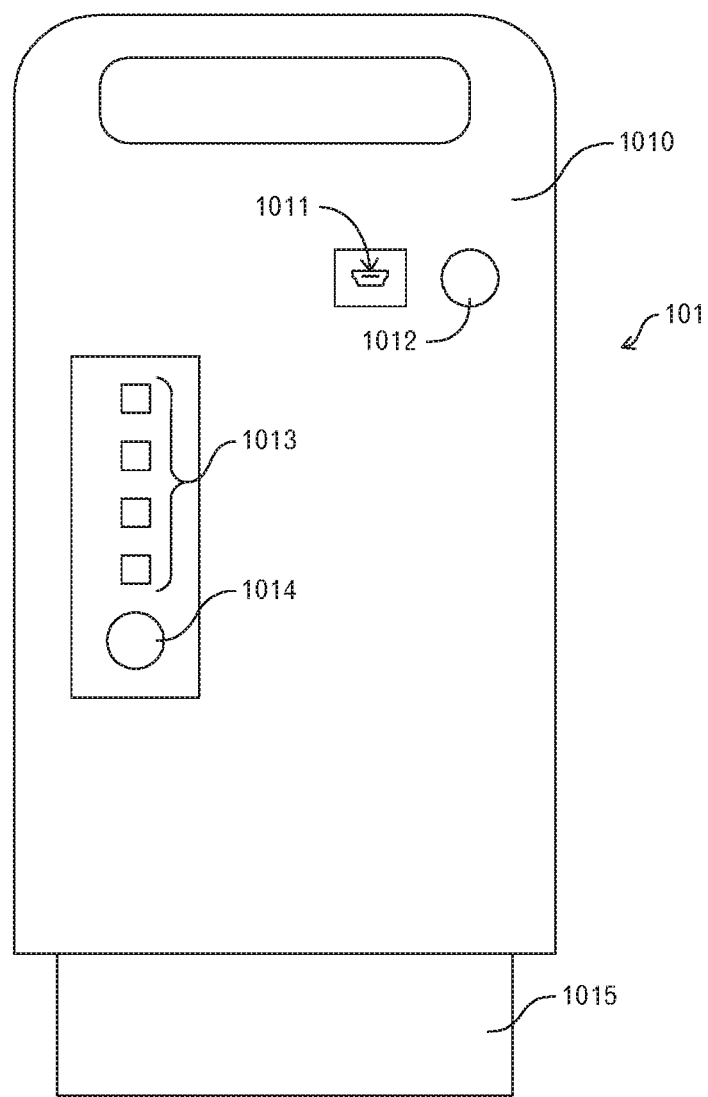
FIG. 2 is an exterior view of a battery pack relating to the first embodiment.

FIG. 2 depicts an exterior view of the battery pack 101 relating to the first embodiment.

The battery pack 101 has, on its housing 1010, a charging terminal 1011, a charging instruction button 1012, Light Emitting Diodes (LEDs) 1013 to display a charging level, a button 1014 to instruct to turn on LEDs 1013, and a connecting part 1015 including connection terminals with the motor driving control apparatus 102.

The LEDs 1013 are turned on according to a rule, for example, when the charging level is equal to or greater than 75% and equal to or less than 100%, all LEDs are turned on, when the charging level is equal to or greater than 50% and less than 75%, three LEDs from the bottom are turned on, when the charging level is equal to or greater than 25% and less than 50%, two LEDs from the bottom are turned on, when the charging level is greater than 5% and less than 25%, one LED from the bottom is turned on, and when the charging level is less than 5%, no LED is turned on. However, this is a mere example, and is conventionally performed. Therefore, no further explanation is made.

The charging terminal 1011 is a connection terminal with the cable 108, and may be a micro Universal Serial Bus (USB) terminal, a mini USB terminal or a USB terminal. Furthermore, it may be a connector for PoE (Power over Ether). Moreover, it may be a socket for a commercial power supply (i.e. outlet). In addition, it may be a connector in a standard in which the electrical power can be supplied. In the example of FIG. 2, it is put on the upper portion of the battery pack 101, however, it may be put on any other position in conformity with the utilization mode.

Although it is not depicted in FIG. 2, a cap for the waterproof may be attached to the charging terminal 1011, when the charging terminal 1011 is provided on a housing surface of the battery pack 101. In addition, it is preferable to have a waterproof function in order to avoid the damage from the rain and the like.

Moreover, the button 1014 to instruct to turn on the LEDs 1013 may also be the charging instruction button 1012. In addition, without providing the charging instruction button 1012, the charging may automatically start upon detecting the insertion of the terminal of the cable 108 or detecting a charging current.

As depicted in (a) of FIG. 3, the bottom surface of the connecting part 1015 has a terminal 1015a for the current, a terminal 1015b for signals and a terminal 1015c for grounding. The number of the terminals for the signals may be greater.

In addition to this, as depicted in (b) of FIG. 3, a battery charger 120 for the battery pack 101 has a plug 1202 to connect with the commercial power supply, a terminal 1201a for the current, which is contacted with the terminal 1015a of the battery pack 101, a terminal 1201b for signals, which is contacted with the terminal 1015b, and a terminal 1201c for grounding, which is contacted with the terminal 1015c. This battery charger 120 is the same as the conventional one, therefore, further explanation is omitted. Moreover, in this embodiment, the motor driving control apparatus 102 also has the same terminals as the battery charger 120 like the conventional one.

In this embodiment, the charging for the battery pack 101 may be conducted by this battery charger 120, and the charging may be conducted by the electrical power generated by the solar photovoltaic device 107 or the like. Especially, by charging by the electrical power generated by the solar photovoltaic device 107 or the like during running, the travelling distance of the electrically assisted bicycle 1 can be prolonged, and the assisted running can be enabled without charging by the battery charger 120 to the utmost. Accordingly, the usability of the user is enhanced.

FIG. 4 depicts a configuration example of functional blocks of the battery pack 101 relating to this embodiment.

This battery pack 101 has terminals 1015a to 1015c for the motor driving control apparatus, terminal 1011a and 1011b that are included in the charging terminal 1011, a circuit board 1100, and a battery cell 1150.

The terminal 1011a is a terminal for the charging current, for example, and the terminal 1011b is a terminal for grounding.

The circuit board 1100 is a board, which is called "a battery pack control board" or "a Battery Management System (BMS) board", and has a controller 1110. The controller has a first controller 1111, switches 1112 and 1113, a switch protection controller 1116, a switch temperature detection element 1117, a cell monitor 1120, a temperature detector 1118, a first current detector 1119, a battery cell temperature detection element 1124, a resistor 1115, a second controller 1114, a second current detector 1121, a power converter 1122 and a resistor 1123.

For example, the switch 1112 is a Metal-Oxide-Semiconductor Field-Effect Transistor (MOSFET), its source is connected to the terminal 1015a, its gate is connected to the switch protection controller 1116, and its drain is connected to a drain of a MOSFET that is the switch 1113. For example, the switch 1113 is a MOSFET, its source is connected to a charging and discharging terminal of the battery cells, its drain is connected to a drain of the switch 1112, and its gate is connected to the switch protection controller 1116.

The switch protection controller 1116 controls the switches 1112 and 1113 in response to an instruction of the first controller 1111 to start or stop the power supply to the motor driving control apparatus and charging. More specifically, in order to avoid the excessive charging to the battery cell 1150, the excessive discharging from the battery cell 1150, and the charging or discharging at abnormal temperatures, the switch protection controller 1116 controls the switches 1112 and 1113 according to states collected by the first controller 1111 such as temperature information detected by the temperature detector 1118, current information detected by the first current detector 1119, and voltage values of the respective cells, which collected by the cell monitor 1120.

The temperature detector 1118 is connected with the switch temperature detection element 1117 and the battery cell temperature detection element 1124, and obtains the temperature information from these elements. The switch temperature detection element 1117 and battery cell temperature detection element 1124 are thermistors, for example, and the respective temperatures of the battery cell 1150 and the switches 1112 and 1113 are detected by these elements. The switch temperature detection element 1117 and the battery cell temperature detection element 1124 are not limited to the thermistors, and may be thermocouples or infrared sensors. The switch temperature may be detected for the circuit protection, and the battery cell temperature may be detected for the battery cell protection. The switch temperature detection element 1117 or the battery cell temperature detection element 1124 is contacted thermally, for example, through a heat conduction member whose thermal conductivity is high, to the switches 1112 and 1113 or the battery cell 1150.

The cell monitor 1120 is connected to the respective cells in the battery cell 1150, and detects voltages of these cells. Specifically, the cell monitor 1120 detects the voltages of these cells that are serially connected, performs the discharging control for the respective cells not so as to lose the voltage balance of the serially connected cells and adjusts the voltage balance.

The first current detector 1119 is connected to the resistor 1115 to detect the charging current and discharging current for the motor driving control apparatus 102. For example, the current value may be calculated from the voltage drop of the resistor, which is directly connected to the current path, such as the resistor 1115. The current detection method is not limited to this method, and various current detection methods such as a hall sensor may be employed.

The second current detector 1121 is connected to the resistor 1123, and detects the current from the charging terminal 1011 to the battery cell 1150. For example, the current value may be calculated from the voltage drop of the resistor, which is directly connected to the current path, such as the resistor 1123. The current detection method is not limited to this method, and various current detection method such as the hall sensor may be employed. The second current detector 1121 detects not only the current to the battery cell 1150 but also the current from the battery cell 1150. In addition, the current value detected by the second current detector 1121 may also be outputted to the second controller 1114.

The power converter 1122 is connected to the battery cell 1150, and performs the charging to the battery cell 1150 by the current from the charging terminal 1011 in response to an instruction from the second controller 1114. As for the circuit type, various types, such as boost, flyback, half bridge or full bridge, can be adopted, and no specific one is designated here. Moreover, the power converter 1122 also has a circuit protection function to stop the charging to the battery cell 1150 in a circuit stop state.

The first controller 1111 obtains various information from the cell monitor 1120, the temperature detector 1118, the first current detector 1119 and the second current detector 1121 to instruct the switch protection controller 1116 to stop the charging and the discharging, and limits the current from the charging terminal 1011. More specifically, the first controller 1111 notifies the second controller 1114 of the limitation of the charging current or charging power from the charging terminal 1011 to cause the second controller 1114 to control the power converter 1122.

Moreover, the first controller 1111 calculates a battery remaining level, deterioration state and the like from the information obtained from the cell monitor 1120, the temperature detector 1118, the first current detector 1119 and the second current detector 1121 and the utilization history, and transmits them to the motor driving control apparatus 102 through the terminal 1015b or the like, for example, by the communication. Furthermore, the first controller 1111 transmits the information obtained from the cell monitor 1120, the temperature detector 1118, the first current detector 1119 and the second current detector 1121 to the motor driving control apparatus 102, and the motor driving control apparatus 102 appropriately performs the control for the charging and discharging for the battery pack 101 based on the received information in order not to make the battery cell 1150 in an abnormal state. However, when it is necessary to adjust the discharging current from the battery cell 1150 or the charging current to the battery cell 1150, the first controller 1111 solely or the first controller 1111 and the motor driving control apparatus 102 in cooperation control the discharging current or charging current. The following explanation is made for a case where the control is performed by the first controller 1111.

Furthermore, the second controller 1114 is connected with the first controller 1111 and the power converter 1122, and controls the power converter 1122 in order to enable the charging from the charging terminal 1011 to the battery cell 1150 in response to an instruction from the first controller 1111. More specifically, the second controller 1114 controls the charging power from the charging terminal 1011 according to the electrical power limit value or the like, which is instructed by the first controller 1111, in response to, for example, the push of the charging instruction button 1012, detection of the terminal insertion of the cable 108 or detection of the charging current.

When the button 1014 is pushed, the first controller 1111 confirms the charging level of the battery cell 1150, and controls the turn-on of the LEDs 1013 according to the charging level. However, this is the same as the conventional function, and further explanation is omitted.

An example is illustrated where the first controller 1111 and the second controller 1114 are separated, however, they may be integrated. Furthermore, an example of one circuit board 1100 is illustrated, however, it may be divided into plural boards.

First Example of Charging Control

Next, the first example of the charging control for the battery cell 1150 will be explained using FIGS. 5 and 6. In the first example, an example will be explained where the charging by the regeneration is prioritized. In other words, the regenerative current of the motor 105 is obtained from the motor driving control apparatus 102 through the terminal 1015a, and an example will be explained where the charging of this regenerative current is prioritized.

In FIG. 5, the horizontal axis represents the charging current or charging power from the terminal 1015a for the motor driving control apparatus, and the vertical axis represents the charging current or charging power. In other words, as depicted by a straight line "a", when the charging current $I_{c1}$ or charging power $P_{c1}$ from the terminal 1015a for the motor driving control apparatus changes from "0" to a charging limit value for the battery cell 1150 (a limit value $I_{c\_limit}$ of the charging current or limit value $P_{c\_limit}$ of the charging power), the charging current $I_{c2}$ or charging power $P_{c2}$ by the second controller 1114 is controlled within a range on and under the straight line "b". More specifically, expressions are represented as follows:

$$I_{c2} \leq I_{c\_limit} - I_{c1} \quad (1)$$

$$P_{c2} \leq P_{c\_limit} - P_{c1} \quad (2)$$

In such a case, for example, the first controller 1111 detects $I_{c1}$ or $P_{c1}$ based on a signal from the first current detector 1119 (FIG. 6: step S1). On the other hand, in response to notification of $I_{c1}$ or $P_{c1}$ from the first controller 1111 or notification of a value of the right side of the expression (1) or (2), the second controller 1114 controls the power converter 1122 so that the charging current $I_{c2}$ or charging power $P_{c2}$ satisfies the expression (1) or (2).

More specifically, an input current or input power from the charging terminal 1011 is originally equal to or less than $(I_{c\_limit}-I_{c1})$ or $(P_{c\_limit}-P_{c1})$ (i.e. a value based on the charging current or charging power by the regeneration) (step S3: Yes route), the second controller 1114 causes the power converter 1122 to perform the charging for the battery cell 1150 by the input current or input power from the charging terminal 1011 (step S5). On the other hand, when the input current or input power from the charging terminal 1011 is greater than $(I_{c\_limit}-I_{c1})$ or $(P_{c\_limit}-P_{c1})$ (step S3: No route), the second controller 1114 causes the power converter 1122 to limit the charging current $I_{c2}$ or charging power $P_{c2}$ so as to satisfy the expression (1) or (2) (step S7). The latter includes a case where the charging current $I_{c2}$ or charging power $P_{c2}$ may be limited for the input current or input power so as to be less than $(I_{c\_limit}-I_{c1})$ or $(P_{c\_limit}-P_{c1})$.

When the regeneration is performed, the regenerative brake works. Therefore, when the charging current or charging power by the regeneration is limited, the effectiveness of the regenerative brake changes. This appears as a change of the braking power, and the user's feeling in the driving changes. Therefore, it may be not preferable. When the charging by the regeneration is prioritized like this example, such a situation can be avoided.

As described above, even when the charging by the regeneration is prioritized, the input current or input power from the charging terminal 1011 may not be limited. For example, when the capability of the electrical power generation by the solar photovoltaic device 107 or the like is low, the input current or input power from the charging terminal 1011 may be used for the charging with almost no limitation except a case that the charging current or charging power due to the regeneration is near the charging limit value.

On the other hand, in case where the motor 105 whose regenerative capability is low is used, more charging may be accomplished when the charging current or charging power from the charging terminal 1011 is prioritized and the charging by the regeneration is limited in some cases.

Furthermore, the charging current or charging power by the regeneration may be limited from the input current from the motor driving control apparatus 102.

In other words, generally, the control is performed so that following inequalities are satisfied.

$$I_{c2}+I_{c1} \leq I_{c\_limit}$$

$$P_{c2}+P_{c1} \leq P_{c\_limit}$$

Second Example of Charging Control

Generally, the limit value of the charging current for the battery cell 1150 changes according to the temperature. One that example is depicted in FIG. 7A. In the example of FIG. 7A, the horizontal axis represents the temperature $\tau$ [° C.] of the battery cell 1150, and the vertical axis represents the limit value $I_{c\_limit}$ of the charging current. Thus, the limit value $I_{c\_limit}$ of the charging current changes according to the temperature $\tau$ of the battery cell 1150, and when the temperature is less than $\tau_2$, the limit value becomes less than the maximum current $I_{max}$.

In addition, the limit value of the charging current for the battery cell 1150 also changes according to the battery voltage. On that example is depicted in FIG. 7B. In the example of FIG. 7B, the horizontal axis represents the battery voltage [V], and the vertical axis represents the limit value $I_{c\_limit}$ of the charging current. Thus, the limit value $I_{c\_limit}$ of the charging current changes according to the battery voltage of the battery cell 1150, and, for example, when the battery voltage exceeds $V_1$, the limit value becomes less than the maximum current $I_{max}$.

Therefore, in this example, the charging current $I_{c1}$ from the terminal 1015a for the motor driving control apparatus and the charging current $I_{c2}$ from the charging terminal 1011 are controlled by a ratio to the maximum current $I_{max}$ or a reference current $I_{ref}$, which is determined by taking into consideration various margins from the maximum current $I_{max}$.

More specifically, for example, the first controller 1111 detects the regenerative current based on the signal from the first current detector 1119 (FIG. 8: step S11). Then, the first controller 1111 determines a value of the maximum current $I_{max}$ or the reference current $I_{ref}$ from the temperature and the battery voltage, and calculates the ratio $R_{c1}$ of the charging current $I_{c1}$ by the regeneration (step S13). In other words, when the input current by the regeneration is equal to or less than a value of the maximum current $I_{max}$ or the reference current $I_{ref}$, the ratio $R_{c1}$ is calculated from the regenerative current. On the other hand, when the regenerative current exceeds a value of the maximum current $I_{max}$ or the reference current $I_{ref}$, the ratio $R_{c1}$ is "1", and the first controller 1111 limits the charging current $I_{c1}$ by the regeneration to a value of the maximum current $I_{max}$ or the reference current $I_{ref}$. In some cases, by setting a predetermined value that is less than "1" as the ratio $R_{c1}$, the charging current $I_{c1}$ may be limited to a value of the current, which is obtained by (the predetermined value*maximum current $I_{max}$ or reference current $I_{ref}$).

Moreover, the first controller 1111 outputs a value of the maximum current $I_{max}$ or the reference current $I_{ref}$ and the ratio $R_{c1}$ to the second controller 1114.

On the other hand, the second controller 1114 determines a ratio $R_{c2}$ of the charging current $I_{c2}$ by the second controller 1114 to the value of the maximum current $I_{max}$ or the reference current $I_{ref}$ so as to satisfy the following expression (step S15).

$$R_{c2} \leq R_{ref} - R_{c1} \quad (3)$$

Typically, the reference value $R_{ref}$ is "1", however, may be a real value, which is equal to or greater than 0 and equal to or less than 1, by further taking into consideration the margins.

In other words, as depicted in HG 9, when the ratio $R_{c1}$ of the charging current $I_{c1}$ by the regeneration changes from "0" to the reference value $R_{ref}$ like a straight line "c", the ratio $R_{c2}$ of the charging current $I_{c2}$ is determined to be a value within a range on and under a straight line "d".

When $R_{c2}$ is determined, the second controller 1114 determines the actual charging current $I_{c2}$ by multiplying $R_{c2}$ to the maximum current $I_{max}$ or the reference current $I_{ref}$ (step S17). The steps S15 and S17 may be performed by the first controller 1111 and the results may be informed to the second controller 1114. After the calculation is performed, when the input current from the charging terminal 1011 exceeds the charging current $I_{c2}$ (step S19: No route), the second controller 1114 causes the power converter 1122 to charge while limiting to the charging current $I_{c2}$ or less (step S23), and when the input current from the charging terminal 1011 is equal to or less than the charging current $I_{c2}$ (step S19: Yes route), the second controller 1114 causes the power converter 1122 to charge by the input current as it is (step S21).

By performing such control, appropriate charging is performed according to the state of the battery cell 1150.

Although the control based on the current was explained above, the control based on the electrical power may be performed similarly.

Furthermore, the charging by the regeneration is prioritized, however, when the motor 105 whose regenerative capability is low is used, the input current from the charging terminal 1011 may be prioritized to perform the charging.

In other words, the control is performed so as to satisfy the following inequality, when it is generalized.

$$R_{c2}+R_{c1} \leq R_{ref}$$

Third Example of Charging Control

In the second example, the capability of the power converter 1122 or the like is not considered. However, when a large current or power is handled, components whose cost is high have to be employed.

Then, in the third example, by placing importance on the cost, a case is considered where the charging current $I_{c2}$ by the second controller 1114 is limited. For example, in this case, the limit value $I_{c2\_limit}$ of the charging current is set for the second controller 1114 or the like.

When the charging current $I_{c2}$, which is obtained by multiplying $R_{c2}$ to the maximum current $I_{max}$ or the reference current $I_{ref}$ is equal to or less than the limit value $I_{c2\_limit}$ of the charging current, this case is the same as the second example.

On the other hand, when the charging current $I_{c2}$ exceeds the limit value $I_{c2\_limit}$ of the charging current, the charging current $I_{c2}$ becomes the limit value $I_{c2\_limit}$ of the charging current.

In order to simplify the explanation, a state is assumed where the temperature and battery voltage are constant and the maximum current $I_{max}$ or the reference current $I_{ref}$ does not change. Under such an assumption, a relationship between the charging current $I_{c1}$ by the regeneration and the charging current $I_{c2}$ will be explained by using FIG. 10.

In FIG. 10, the horizontal axis represents the charging current (regenerative current) from the terminal 1015a for the motor driving control apparatus, and the vertical axis represent the charging current. In other words, as illustrated by the straight line "a", when the charging current $I_{c1}$ from the terminal 1015a for the motor driving control apparatus changes from "0" to the charging limit value for the battery cell 1150 (the limit value $I_{c\_limit}$ of the charging current), the charging current $I_{c2}$ by the second controller 1114 is controlled to be within a range on or under a line "e". More specifically, this is represented as follows:

$$I_{c2} \leq I_{c\_limit} - I_{c1} \text{ IF } I_{c2} \leq I_{c2\_limit} \tag{4}$$

$$I_{c2} \leq I_{c2\_limit} \text{ IF } I_{c2} > I_{c2\_limit} \tag{5}$$

In FIG. 10, the expression (4) is represented in a section E1, and the expression (5) is represented in a section E2.

In this case, in FIG. 10, the range on and above the dashed line "f" and on and under the charging limit value is a range in which the charging is prohibited, although the charging is possible. This is because the cost is prioritized.

Although an example in which the limitation is set for the current was explained above, the limitation for the electrical power may be set.

Furthermore, like the second example, the ratio to the value of the maximum current $I_{max}$ or the reference current $I_{ref}$ may be changed as illustrated in FIG. 10. In other words, in any battery state, the charging current $I_{c2}$ by the second controller 1114 is limited to ($\gamma$*100) % of the maximum current $I_{max}$ or the reference current $I_{ref}$, in principle. When the ratio of the charging current $I_{c1}$ by the regeneration exceeds (1-$\gamma$) % of the value of the maximum current $I_{max}$ or the reference current $I_{ref}$, the ratio of the charging current $I_{c2}$ is decreased by the excess part.

Furthermore, the charging by the regeneration was prioritized, however, when the motor 105 whose regenerative capability is low is employed, the input current from the charging terminal 1011 may be prioritized to perform the charging.

Fourth Example of Charging Control

In this example, an example will be depicted where more simple control is performed. When the temperature is less than $\tau_2$ in FIG. 7A, the limit value $I_{c\_limit}$ of the charging current is less than the maximum current $I_{max}$. Similarly, when the battery voltage exceeds $V_1$ in FIG. 7B, the limit value $I_{c\_limit}$ of the charging current is less than the maximum current $I_{max}$.

Therefore, in this example, as depicted in FIG. 11, in a state where the limitation for the charging current is made (i.e. the charging can be performed only with a current that is less than the maximum current $I_{max}$), the charging is not performed from the charging terminal 1011, and the charging is performed by the regenerative current with the charging current $I_{c\_limit}$, which is determined by the battery state. Accordingly, the control is simplified.

Furthermore, in a state where there is no limitation for the charging current (i.e. it is possible to charge by the maximum current), when the input current from the charging terminal 1011 is not detected or when the charging is not performed from the charging terminal 1011, $I_{max}$ is set as the upper limit value of the charging current $I_{c1}$ by the regeneration. In other words, the charging is performed only by the regenerative current.

On the other hand, when the input current from the charging terminal 1011 is detected or when the charging is performed from the charging terminal 1011, a value obtained by multiplying a coefficient $\alpha$ (which is greater than 0 and less than 1) to $I_{max}$ is set as the upper limit of the charging current $I_{c1}$ by the regeneration. In other words, when the regenerative current from the motor driving control apparatus 102 exceeds ($I_{max}$*$\alpha$), the charging current $I_{c1}$ is limited to ($I_{max}$*$\alpha$). In addition, as the upper limit value of the charging current $I_{c2}$ by the second controller 1114, $\{I_{max}*(1-\alpha)\}$ is set. In other words, when the input current from the charging terminal 1011 exceeds $\{I_{max}*(1-\alpha)\}$, the charging current $I_{c2}$ is limited to $\{I_{max}*(1-\alpha)\}$.

Thus, by appropriately setting the coefficient $\alpha$, it is possible to appropriately achieve both the charging by the regeneration and the charging by the input current from the charging current 1011. Furthermore, because of the simple control based on the separate cases, it is possible to reduce the cost of the controller 1110.

More specifically, the first controller 1111 detects a state of the battery cell 1150 based on the information obtained from the cell monitor 1120, temperature detector 1118 and the like (FIG. 12: step S31), and identifies the limit value $I_{c\_limit}$ of the charging current according to the state of the battery cell 1150.

When the limit value $I_{c\_limit}$ of the charging current is less than the maximum current $I_{max}$ (step S33: Yes route), the first controller 1111 notifies the second controller 1114 that it is impossible to charge, and performs the charging by the regeneration while limiting the charging current to the limit value $I_{c\_limit}$ of the charging current, which is determined according to the state of the battery cell 1150, or less (step S35). In other words, when the regenerative current is equal to or less than the limit value $I_{c\_limit}$ of the charging current, which is determined according to the state of the battery cell 1150, the charging is performed by the regenerative current, and when the regenerative current exceeds the limit value $I_{c\_limit}$ of the charging current, which is determined according to the state of the battery cell 1150, the charging is performed by limiting the charging current to the limit value $I_{c\_limit}$ of the charging current, which is determined according to the state of the battery cell 1150.

The second controller 1114 instructs the power converter 1122 in response to the notification representing that it is impossible to charge, and shuts off the input current from the charging terminal 1011 to stop the charging (step S37).

On the other hand, when the limit value $I_{c\_limit}$ of the charging current is the maximum current $I_{max}$ (step S33: No route), the first controller 1111 checks the input current from the charging terminal 1011 by the second current detector 1121 (step S39). When it is impossible to detect the input current from the charging terminal 1011 (step S41: No route), the first controller 1111 performs the charging by the regeneration up to the maximum current $I_{max}$ (step S45). Thus, only the charging by the regeneration is performed.

On the other hand, when the input current from the charging terminal 1011 was detected (step S41: Yes route), the first controller 1111 notifies the second controller 1114 of {the maximum current $I_{max}*(1-\alpha)$}, and in response to this notification, the second controller 1114 causes the power converter 1122 to perform the charging by the input current from the charging terminal 1011 up to {the maximum current $I_{max}*(1-\alpha)$} (step S43). In other words, when the input current from the charging terminal 1011 is equal to or less than {the maximum current $I_{max}*(1-\alpha)$}, the charging is performed by the input current, and when the input current exceeds {the maximum current $I_{max}*(1-\alpha)$}, the charging is performed while limiting the input current to {the maximum current $I_{max}*(1-\alpha)$}.

Moreover, the first controller 1111 performs the charging by the regeneration up to (the maximum current $I_{max}*\alpha$) (step S47). In other words, when the regenerative current is equal to or less than (the maximum current $I_{max}*\alpha$), the charging is performed by the regenerative current, and when the regenerative current exceeds (the maximum current $I_{max}*\alpha$), the charging is performed while limiting the regenerative current up to (the maximum current $I_{max}*\alpha$). Instead of the multiplication of the coefficient $\alpha$, a value obtained by subtracting a coefficient value from the maximum value may be employed for the upper limit value of the charging current by the regenerative current, and the coefficient value may be employed as the upper limit value of the charging current by the second controller 1114.

Accordingly, it is possible to divide the charging among the regenerative current and the input current from the charging terminal 1011. In addition, the control is simple, and by appropriately setting the coefficient $\alpha$, it is possible to reduce the cost for components used for the power converter 1122 and the like.

As for this embodiment, the control may be performed based on the electrical power instead of the current.

In addition, instead of the maximum current, a current value obtained by taking into consideration a predetermined margin for the maximum current may be employed.

Embodiment 2

In the first embodiment, the example was explained where the charging terminal is provided for the battery pack 101. However, in this embodiment, an example will be explained where an output terminal is provided.

FIG. 13 depicts an external view of an electrically assisted bicycle 1b relating to this embodiment.

The electrically assisted bicycle 1b has the motor driving control apparatus 102, a battery pack 101b, the torque sensor 103, the pedal rotation sensor 104, the motor 105, the control panel 106, an apparatus 109 that consumes the electrical power or is to be charged, and the cable 108.

The battery pack 101b includes, for example, a lithium ion secondary battery, a lithium ion polymer secondary battery, a nickel-metal hydride chargeable battery or the like, and supplies the electrical power to the motor 105 via the motor driving control apparatus 102 and performs charging by the regenerative power from the motor 105 via the motor driving control apparatus 102 in the regeneration. Furthermore, a new output terminal is provided for the battery pack 101b, and the battery pack 101b is connected to the apparatus 109 through the cable 108 connected to the output terminal.

The apparatus 109 is an apparatus that consumes the electrical power while the electrically assisted bicycle 1b is running, such as a light, a refrigerator, a temperature regulator, a humidity maintenance device or the like in addition to an information processing apparatus such as a personal computer, a mobile communication terminal including a smartphone. However, an apparatus that consumes the electrical power even during stop of the electrically assisted bicycle 1b can be connected to the battery pack 101b. For example, in a disaster or other time, there are a lot of cases where it is useful to receive the power supply from the battery pack 101b.

The elements, which are other than the apparatus 109 and the battery pack 101b, are the same as those in the first embodiment. Therefore, the explanation for the elements is omitted.

FIG. 14 depicts an external view of the battery pack 101b relating to this embodiment.

The battery pack 101b has, on a housing 1010b, an output terminal 1016, an output instruction button 1017, the LEDs 1013 for displaying the charging level, a button 1014 to instruct to turn on the LEDs 1013, and the connecting part 1015 including connection terminals with the motor driving control apparatus 102.

The LEDs 1013 and button 1014 are the same as those in the first embodiment.

The output terminal 1016 is a connection terminal with the cable 108, and may be a USB terminal or USB-PD (Power Delivery) terminal or another USB terminal. Furthermore, it may be a connector for the PoE (Power over Ether). In addition, it may be a connector in a standard in which the electrical power output can be performed. In the example of FIG. 14, it is disposed on the upper portion of the battery pack 101b, however, may be disposed on any position in conformity with the utilization mode.

Although it is not depicted in FIG. 14, any cap for the waterproof may be attached. In addition, it is preferable to have a waterproof function in order to avoid the damage from the rain and the like.

Moreover, the button 1014 to instruct to turn on the LEDs 1013 may also be the output instruction button 1017. In addition, without providing the output instruction button 1017, the electrical power output may automatically start upon detecting the insertion of the terminal of the cable 108 or the like.

The connecting part 1015 is the same as that in the first embodiment.

In this embodiment, for example, while the electrically assisted bicycle 1b is running, the electrical power, which is charged in the battery pack 101b, is used for driving the motor 105, and also used for the apparatus 109. Thus, the usability of the user is enhanced. There is no problem in case where the electrical power is not used for the driving of the motor 105 such as during the stop, however, it is required to appropriately control the electrical power to be used for the apparatus 109 in relation to the electrical power to be used for driving of the motor 105.

FIG. 15 depicts a functional block configuration example of the battery pack 101b relating to this embodiment.

The battery pack 101b relating to this embodiment has the terminals 1015a to 1015c for the motor driving control apparatus, terminals 1016a and 1016b, which are included in the output terminal 1016, a circuit board 1100b and the battery cell 1150.

The terminal 1016a is a terminal for the output current, for example, and the terminal 1016b is a terminal for grounding, for example.

The circuit board 1100b is a board, which is called a battery pack control board or Battery Management System (BMS) board, and has a controller 1110b. The controller 1110b has a first controller 1111b, the switches 1112 and 1113, the switch protection controller 1116, the switch temperature detection element 1117, the cell monitor 1120, the temperature detector 1118, the first current detector 1119, the battery cell temperature detection element 1124, the resistor 1115, a second controller 1114b, the second current detector 1121, a power converter 1122b and the resistor 1123.

The switches 1112 and 1113, the switch protection controller 1116, the cell monitor 1120, the temperature detector 1118, the switch temperature detection element 1117, the battery cell temperature detection element 1124, the first current detector 1119, the second current detector 1121 and the resistor 1115 are the same as those in the first embodiment.

The power converter 1122*b* is connected with the battery cell 1150, and performs discharging to the output terminal 1016 in response to an instruction from the second controller 1114*b*. As for the circuit type, various types, such as boost, flyback, half bridge or full bridge, can be adopted, and no specific one is designated here. Moreover, the power converter 1122*b* also has a circuit protection function to stop output from the battery cell 1150 in a circuit stop state.

The first controller 1111*b* obtains various information from the cell monitor 1120, the temperature detector 1118, the first current detector 1119 and the second current detector 1121 to instruct the switch protection controller 1116 to stop the charging and the discharging, and limits the output current to the output terminal 1016. More specifically, the first controller 1111*b* notifies the second controller 1114*b* of the limitation of the discharging current or discharging power by the output terminal 1016 to cause the second controller 1114*b* to control the power converter 1122*b*. Other functions are the same as those in the first controller 1111 relating to the first embodiment.

Furthermore, the second controller 1114*b* is connected with the first controller 1111*b* and the power converter 1122*b*, and controls the power converter 1122*b* in order to cause to output the electrical power from the output terminal 1016 in response to an instruction from the first controller 1111*b*. More specifically, the second controller 1114*b* controls the electrical power to be outputted from the output terminal 1016 according to the electrical power limit value or the like, which is instructed from the first controller 1111*b*, in response to, for example, the push of the output instruction button 1017, detection of the terminal insertion of the cable 108 or detection of the output current.

An example is illustrated where the first controller 1111*b* and the second controller 1114*b* are separated, however, they may be integrated. Furthermore, an example of one circuit board 1100*b* is illustrated, however, it may be divided into plural boards.

Furthermore, the charging terminal 1011 may be the same as the output terminal 1016.

[First Example of Discharging Control]

Next, the first example of the discharging control from the battery cell 1150 will be explained by using FIG. 16A. In the first example, an example will be explained where the power supply for the motor 105 is prioritized. In other words, the current for driving the motor 105 flows to the motor driving control apparatus 102 through the terminal 1015*a*, and an example will be explained by using FIG. 16A, where this electrical power supply for driving the motor 105 is prioritized.

In FIG. 16A, the horizontal axis represents the output current or output power to the terminal 1015*a* for the motor driving control apparatus, and the vertical axis represents the output current or output power. In other words, as depicted by a straight line "g", when the output current $I_{o1}$ or output power $P_{o1}$ to the terminal 1015*a* for the motor driving control apparatus 102 changes from "0" to an output limit value of the battery cell 1150 (a limit value $I_{o\_limit}$ of the output current or a limit value $P_{o\_limit}$ of the output power), the output current $I_{o2}$ or output power $P_{o2}$ by the second controller 1114*b* is controlled within a range on and under the straight line "h". More specifically, expressions are represented as follows:

$$I_{o2} \leq I_{o\_limit} - I_{o1} \quad (6)$$

$$P_{o2} \leq P_{o\_limit} - P_{o1} \quad (7)$$

In such a case, for example, the first controller 1111*b* detects $I_{o1}$ or $P_{o1}$ based on a signal from the first current detector 1119 (FIG. 16B: step S501). On the other hand, in response to notification of $I_{o1}$ or $P_{o1}$ from the first controller 1111*b* or notification of a value of the right side of the expression (6) or (7), the second controller 1114*b* performs control so that the output current $I_{o2}$ or output power $P_{o2}$ to the output terminal 1016 satisfies the expression (6) or (7) (step S503).

The second controller 1114*b* controls the power converter 1122*b* to cause the battery cell 1150 to discharge so that the output current $I_{o2}$ or output power $P_{o2}$ is equal to or less than $(I_{o\_limit} - I_{o1})$ or $(P_{o\_limit} - P_{o1})$. When another apparatus 109 needs the current or electrical power that exceeds $(I_{o\_limit} - I_{o1})$ or $(P_{o\_limit} - P_{o1})$, the second controller 1114*b* limits the output current $I_{o2}$ or output power $P_{o2}$ to $(I_{o\_limit} - I_{o1})$ or $(P_{o\_limit} - P_{o1})$ or less.

In case where the electrically assisted bicycle 1*b* is running, it becomes impossible to obtain appropriate torque when the power supply is not performed so as to drive the motor 105 according to the control of the motor driving control apparatus 102. This may not be preferable, because the user feels it as the shortage of assisting power. Like this example, by prioritizing the output to the motor driving control apparatus 102, such a situation can be avoided.

However, the output current or output power to the motor driving control apparatus 102 may be limited from the current or electrical power requested based on the control of the motor driving control apparatus 102, because of various reasons.

In addition, according to the property of the apparatus 109, it may be affirmative that the power supply is prioritized than the motor driving. For example, there is a case where the power supply is maintained to some extent in order to keep the temperature or humidity in the apparatus 109.

By considering such a situation, the control is generally performed so that following inequalities are satisfied.

$$I_{o2} + I_{o1} \leq I_{o\_limit}$$

$$P_{o2} + P_{o1} \leq P_{o\_limit}$$

[Second Example of Discharging Control]

Generally, the limit value of the discharging current for the battery cell 1150 changes according to the temperature. One that example is depicted in FIG. 17A. In the example of FIG. 17A, the horizontal axis represents the temperature τ [° C.] of the battery cell 1150, and the vertical axis represents the limit value $I_{o\_limit}$ of the discharging current. Thus, the limit value $I_{o\_limit}$ of the discharging current changes according to the temperature τ of the battery cell 1150, and when the temperature is less than $τ_4$, the limit value becomes less than the maximum current $I_{max2}$.

In addition, the limit value of the discharging current for the battery cell 1150 also changes according to the battery voltage. One that example is depicted in FIG. 17B. In the example of FIG. 17B, the horizontal axis represents the battery voltage [V], and the vertical axis represents the limit value $I_{o\_limit}$ of the discharging current. Thus, the limit value $I_{o\_limit}$ of the discharging current changes according to the battery voltage of the battery cell 1150, and, for example, when the battery voltage becomes less than V4, the limit value becomes less than the maximum current $I_{max2}$.

Therefore, in this example, the output current $I_{o1}$ to the terminal 1015a for the motor driving control apparatus and the output current $I_{o2}$ to the output terminal 1016 are controlled by a ratio to the maximum current $I_{max2}$ or a reference current $I_{ref2}$, which is determined by taking into consideration various margins from the maximum current $I_{max2}$.

More specifically, for example, the first controller 1111b detects the output current for the motor driving based on the signal from the first current detector 1119 (FIG. 18: step S101). Then, the first controller 1111b determines a value of the maximum current $I_{max2}$ or the reference current $I_{ref2}$ from the temperature and the battery voltage, and calculates the ratio $R_{o1}$ of the output current $I_{o1}$ for the motor driving (step S103).

In other words, when the output current for the motor driving is equal to or less than a value of the maximum current $I_{max2}$ or the reference current $I_{ref2}$, the ratio $R_{o1}$ is calculated from the output current for the motor driving. When the output current for the motor driving reaches the value of the maximum current $I_{max2}$ or the reference current $I_{ref2}$, the ratio $R_{o1}$ becomes "1", and for example, the first controller 1111b limits the current to the motor driving control apparatus 102 so that the current that exceeds the maximum current $I_{max2}$ or the reference current $I_{ref2}$ does not flow. In some cases, a predetermined value that is less than "1" may be set as the ratio $R_{o1}$, and the output current $I_{o1}$ for the motor driving may be limited to the current obtained by (the predetermined value*maximum current $I_{max2}$ or reference current $I_{ref2}$).

Moreover, the first controller 1111b outputs the value of the maximum current $I_{max2}$ or the reference current $I_{ref2}$, and the ratio $R_{o1}$ to the second controller 1114b.

On the other hand, the second controller 1114b determines a ratio $R_{o2}$ of the output current $I_{o2}$ to the output terminal 1016 to a value of the maximum current $I_{max2}$ or the reference current $I_{ref2}$ satisfies a following expression (step S105).

$$R_{o2} \leq R_{ref2} - R_{o1} \qquad (8)$$

The reference value $R_{ref2}$ is, typically, "1", however, a real value that is equal to or greater than 0 and equal to or less than 1 may be set, when further considering margins.

In other words, as depicted in FIG. 19, when the ratio $R_{o1}$ of the output current $I_{o1}$ for the motor driving changes from 0 to the reference value $R_{ref2}$ like a straight line "j", the ratio $R_{o2}$ of the output current $I_{o2}$ to the output terminal 1016 is determined to be a value within a range on and under a straight line "k".

When the $R_{o2}$ is determined, the second controller 1114b determines the output current $I_{o2}$ by multiplying the $R_{o2}$ to the maximum current $I_{max2}$ or the reference current $I_{ref2}$ (step S107). The first controller 1111b may perform calculation for the steps S105 and S107, and output the output current $I_{o2}$ to the second controller 1114b. The second controller 1114b controls the current to be supplied so that the current is equal to or less than the output current $I_{o2}$ obtained by such calculation (step S109).

By such control, it becomes possible to perform appropriate power supply according to the state of the battery cell 1150.

Although the above explanation was made for the current, the control may be performed for the electrical power, similarly.

Furthermore, according to the property of the apparatus 109, the power supply to the apparatus 109 may be prioritized. Therefore, when generalized, the control is performed so that the following inequality is satisfied.

$$R_{o2} + R_{o1} \leq R_{ref2}$$

[Third Example of Discharging Control]

In the second example, the capability of the power converter 1122b or the like was not considered. However, when large current or large electrical power is handled, components with high cost has to be employed.

Then, in the third example, by placing importance on the cost, a case is considered where the output current $I_{o2}$ by the second controller 1114b is limited. For example, in this case, the limit value $I_{o2\_limit}$ of the output current is set for the second controller 1114b.

When the output current $I_{o2}$, which is obtained by multiplying $R_{o2}$ to the maximum current $I_{max2}$ or the reference current $I_{ref2}$ is equal to or less than the limit value $I_{o2\_limit}$ of the output current, this case is the same as the second example.

On the other hand, when the output current $I_{o2}$ exceeds the limit value $I_{o2\_limit}$ of the output current, the actual output current $I_{o2}$ becomes the limit value $I_{o2\_limit}$ of the output current.

In order to simplify the explanation, a state is assumed where the temperature and battery voltage are constant and the maximum current $I_{max2}$ or the reference current $I_{ref2}$ does not change. Under such an assumption, a relationship between the output current $I_{o1}$ for the motor driving and the output current $I_{o2}$ will be explained by using FIG. 20.

In FIG. 20, the horizontal axis represents the output current for the motor driving, and the vertical axis represents the output current. In other words, as illustrated by the straight line "g", when the output current $I_{o1}$ for the motor driving changes from "0" to the output limit value of the battery cell 1150 (the limit value $I_{o\_limit}$ of the output current), the output current $I_{o2}$ by the second controller 1114b is controlled to be within a range on or under a line "m". More specifically, this is represented as follows:

$$I_{o2} \leq I_{o\_limit} - I_{o1} \text{ IF } I_{o2} \leq I_{o2\_limit} \qquad (9)$$

$$I_{o2} \leq I_{o2\_limit} \text{ IF } I_{o2} > I_{o2\_limit} \qquad (10)$$

In FIG. 20, the expression (9) is represented in a section M1, and the expression (10) is represented in a section M2.

In this case, in FIG. 20, the range on and above the dashed line "n" and on and under the output limit value is a range in which the output is prohibited, although the output is possible. This is because the cost is prioritized.

Although an example in which the limitation is set for the current was explained above, the limitation for the electrical power may be set.

Furthermore, like the second example, the ratio to the value of the maximum current $I_{max2}$ or the reference current $I_{ref2}$ may be changed as illustrated in FIG. 20. In other words, in any battery state, the output current $I_{o2}$ to the output terminal 1016 is limited to ($\gamma$*100) % of the maximum current $I_{max2}$ or the reference current $I_{ref2}$, in principle. When the ratio of the output current $I_{o1}$ for the motor driving exceeds (1−$\gamma$) % of the value of the maximum current $I_{max2}$ or the reference current $I_{ref2}$, the ratio of the output current $I_{o2}$ is decreased by the excess part.

Furthermore, the output for the motor driving was prioritized, however, when there is a reason that the output to the apparatus 109 have to be prioritized, the output to the output terminal 1016 may be prioritized to perform the discharging.

[Fourth Example of Discharging Control]

In this example, an example will be represented where more simple control is performed. When the temperature is less than $\tau_4$ in FIG. 17A, the limit value $I_{o\_limit}$ of the output current is less than the maximum current $I_{max2}$. Similarly, when the battery voltage is less than V4 in FIG. 17B, the limit value $I_{o\_limit}$ of the output current is less than the maximum current $I_{max2}$.

Therefore, in this example, as depicted in FIG. 21, in a state where the limitation for the output current is made (i.e. the output can be performed only with a current that is less than the maximum current $I_{max2}$), the output is not performed from the output terminal 1016, and the output for the motor driving is performed with the output current $I_{o\_limit}$, which is determined by the battery state. Accordingly, the control is simplified.

Furthermore, in a state where there is no limitation for the output current (i.e. it is possible to output the maximum current), when the output current from the output terminal 1016 is not demanded or when the output is not performed from the output terminal 1016, $I_{max2}$ is set as the upper limit value of the output current $I_{o1}$ for the motor driving. In other words, the output is performed only for the motor driving control apparatus 102.

On the other hand, when the output is demanded from the output terminal 1016, a value obtained by multiplying a coefficient β (which is greater than 0 and less than 1) to $I_{max2}$ is set as the upper limit of the output current $I_{o1}$ for the motor driving. In other words, the output current to the motor driving control apparatus 102 is limited to ($I_{max2}$*β) or less. In addition, as the upper limit value of the output current $I_{o2}$ to the output terminal 1016, {$I_{max2}$*(1-β)} is set. In other words, the output current to the output terminal 1016 is limited to {$I_{max2}$*(1-β)} or less.

Thus, by appropriately setting the coefficient β, it is possible to appropriately balance both the output for the motor driving and the output to the output terminal 1016. Furthermore, because of the simple control based on the separate cases, it is possible to reduce the cost of the controller 1110b.

More specifically, the first controller 1111b detects a state of the battery cell 1150 based on the information obtained from the cell monitor 1120, temperature detector 1118 and the like (FIG. 22: step S131), and identifies the limit value $I_{o\_limit}$ of the output current according to the state of the battery cell 1150.

When the limit value $I_{o\_limit}$ of the output current is less than the maximum current $I_{max2}$ (step S133: Yes route), the first controller 1111b notifies the second controller 1114b that it is impossible to output, and performs the output for the motor driving while limiting the output current to the limit value $I_{o\_limit}$ of the output current, which is determined according to the state of the battery cell 1150, or less (step S135). In other words, the current supply is limited so that the output current for the motor driving is equal to or less than the limit value $I_{o\_limit}$ of the output current, which is determined according to the state of the battery cell 1150.

In response to the notification representing that it is impossible to output, the second controller 1114b instructs the power converter 1122b to shut off the output current to the output terminal 1016 and not to output the current (step S137).

On the other hand, when the limit value $I_{o\_limit}$ of the output current is the maximum current $I_{max2}$ (step S133: No route), the first controller 1111b checks the output terminal 1016 by the second current detector 1121 (step S139). When it is impossible to detect any other apparatus 109 connected with the output terminal 1016 (step S141: No route), the first controller 1111b performs the output for the motor driving up to the maximum current $I_{max2}$ (step S145). Thus, only the output for the motor driving is performed.

On the other hand, when any other apparatus 109 connected with the output terminal 1016 can be detected (step S141: Yes route), the first controller 1111b notifies the second controller 1114b of {the maximum current $I_{max2}$*(1-β)}, and in response to this notification, the second controller 1114b causes the power converter 1122b to perform the output to the output terminal 1016 up to {the maximum current $I_{max2}$*(1-β)} (step S143). In other words, the output is performed so that the output current to the output terminal 1016 is equal to or less than {the maximum current $I_{max2}$*(1-β)}.

Moreover, the first controller 1111b performs the output for the motor driving up to (the maximum current $I_{max2}$*β) (step S147). In other words, the output is performed so that the output current for the motor driving becomes equal to or less than (the maximum current $I_{max2}$*β).

With this configuration, the current is divided appropriately to the output current for the motor driving and the output current to the output terminal 1016. In addition, the control is simple, and by appropriately setting the coefficient β, it is possible to reduce the cost for components used for the power converter 1122b and the like. Instead of multiplying the coefficient β, a value obtained by subtracting the coefficient value from the maximum value may be employed for the upper limit value for the output current for the motor driving, and the coefficient value may be employed for the upper limit value for the output current to the output terminal 1016.

As for this embodiment, the control may be performed not only based on the electrical power instead of the current.

In addition, instead of the maximum current, a current value obtained by taking into consideration a predetermined margin for the maximum current may be employed.

Embodiment 3

In the aforementioned first and second embodiments, attention is paid to the control for charging and discharging, which is an original function of the battery, however, when a terminal, which follows a standard in which the communication can be performed such as USB, is provided, data communication can be performed between an external apparatus and the battery pack.

For example, this embodiment includes a terminal for the data communication in added terminals, after implementing both the first and second embodiments.

FIG. 23 depicts a functional block diagram of a battery pack 101c relating to this embodiment. In this embodiment, a terminal 1018 for charging and output is added to the battery pack 101c, and this terminal 1018 includes a terminal 1018a for the charging current and output current, a terminal 1018b for grounding for the electrical line in which the charging current and output current flow, a terminal 1018c for the data communication, and a terminal 1018d for grounding for the electrical line for the data communication.

The circuit board 1100c relating to this embodiment includes a controller 1110c, and the controller 1110c has a first controller 1111c, the switches 1112 and 1113, the switch protection controller 1116, the switch temperature detection element 1117, the cell monitor 1120, the temperature detector 1118, the first current detector 1119, the battery cell temperature detection element 1124, the resistor 1115, a second controller 1114c, the second current detector 1121, a power converter 1122c, the resistor 1123 and a communication unit 1125.

The switches 1112 and 1113, the switch protection controller 1116, the cell monitor 1120, the temperature detector 1118, the switch temperature detection element 1117, the battery cell temperature detection element 1124, the first current detector 1119, the second current detector 1121 and the resistor 1115 are the same as those in the first embodiment.

The second controller 1114c and the power converter 1122c respectively have functions in the first and second embodiments.

The communication unit 1125 is connected with the first controller 1111c and the terminal 1018c and 1018d, and performs processing relating to the communication between the external apparatus connected with the terminal 1018 and the first controller 1111c.

For example, when the personal computer or smartphone, as the external apparatus, is connected through a cable with the terminal 1018, the first controller 1111c collects data to be output to the external apparatus, namely, various information such as various temperatures, voltage, current, electrical power and battery level of the battery cell from the cell monitor 1120, the temperature detector 1118, the first current detector 1119, the second current detector 1121 and the like. Characteristic data in this embodiment includes a current amount or an amount of power, which is charged through the terminal 1018 and a current amount or an amount of power, which is outputted through the terminal 1018. For example, when it is detected by the second current detector 1121 or the like that the external apparatus is connected with the terminal 1018, the first controller 1111c makes the communication unit 1125 establish a connection with the external apparatus connected with the terminal 1018. In addition, the external apparatus inputs a data output request to the communication unit 1125 through the terminal 1018, and in response to this, the communication unit 1125 outputs the data output request to the first controller 1111c. The first controller 1111c outputs the data relating to the request to the external apparatus through the communication unit 1125 only when the data output request is received. Accordingly, it is possible to decrease the power consumed by always outputting data.

In addition, when the motor driving control apparatus 102 has a function to calculate a traveling distance based on signals from the rotation sensor of the motor 105, and/or calculate a consumed calorie based on signals of the torque sensor 103 and/or pedal rotation sensor 104, such data is outputted to the external apparatus through the first controller 1111c, the communication unit 1125 and the terminal 1018.

A driver program and an application program for the battery pack 101c are installed into the external apparatus, for example, and by the application program, data obtained from the battery pack 101c is displayed on a display device. As described above, the current amount or the amount of electrical power, which is charged through the terminal 1018, the current amount or the amount of electrical power, which is outputted through the terminal 1018, the traveling distance, the consumed calorie, battery level (charging level) and the like are displayed on the display device.

By doing so, it becomes possible to present more kinds of data than data outputted by the control panel 106, which is generally equipped on the electrically assisted bicycle 1, for the user.

Reversely, it becomes possible to perform processing by much proper programs by inputting update data for programs included in the controller 1110c and/or the motor driving control apparatus 102 through the terminal 1018 from, for example, the personal computer, to cause to execute update processing for the programs. In addition, functional enhancement may be enabled. Setting data may be updated.

Moreover, in view of the security, a mode in which the data communication is enabled only when a specific apparatus is connected, a mode in which the data communication is enabled after the general password verification, or a mode in which the data communication is enabled only when a key is separately inserted may be employed.

Embodiment 4

By providing plural charging terminals on the battery pack, the charging may be performed in parallel, and by providing plural output terminals, the power output may be performed for plural apparatuses.

For example, as illustrated in FIG. 24, charging terminals 1011X and 1011Y may be provided on the battery pack 101d, and output terminals 1016X and 1016Y may be provided. The number of terminals is not limited to "2", and more terminals may be provided. Plural terminals may be provided only for the charging, and plural terminals may be provided only for the output. Furthermore, plural terminals that can perform both charging and output like the third embodiment may be provided.

FIGS. 25A and 25B, which are combined through a dashed line and symbols P, Q, S and T, depict a functional block diagram of the battery pack 101d depicted in FIG. 24.

The battery pack 101d relating to this embodiment has the terminals 1015a to 1015c for the motor driving control apparatus, charging terminals 1011X and 1011Y, output terminal 1016X and 1016Y, a circuit board 1100e and the battery cell 1150.

The circuit board 1100e has a controller 1110e, and the controller 1110e has the switches 1112 and 1113, the switch protection controller 1116, the switch temperature detection element 1117, the cell monitor 1120, the temperature detector 1118, the first current detector 1119, the battery cell temperature detection element 1124, the resistor 1115, a second controller 1114e, a second current detector 1121, a first power converter 1122e, a resistor 1123, a third current detector 1131, a resistor 1132, a second power converter 1133, a fourth current detector 1134, a resistor 1135, a third power converter 1136, a fifth current detector 1137, a resistor 1138, and a fourth power converter 1139.

The second current detector 1121 detects a value of the current that flows the resistor 1123, the current is controlled by the first power converter 1122e, and the second current detector 1121, the resistor 1123 and the first power converter 1122e are associated with the charging terminal 1011X. The value of the current detected by the second current detector 1121 is outputted to the first controller 1111e.

The third current detector 1131 detects a value of the current that flows the resistor 1132, the current is controlled by the second power converter 1133, and the third current detector 1131, the resistor 1132 and the second power converter 1133 are associated with the charging terminal 1011Y. The value of the current detected by the third current detector 1131 is outputted to the first controller 1111e.

The fourth current detector 1134 detects a value of the current that flows the resistor 1135, the current is controlled by the third power converter 1136, and the fourth current detector 1134, the resistor 1135 and the third power converter 1136 are associated with the output terminal 1016X. The value of the current detected by the fourth current detector 1134 is outputted to the first controller 1111e.

The fifth current detector 1137 detects a value of the current that flows the resistor 1138, the current is controlled by the fourth power converter 1139, and the fifth current detector 1137, the resistor 1138 and the fourth power converter 1139 are associated with the output terminal 1016Y. The value of the current detected by the fifth current detector 1137 is outputted to the first controller 1111e.

The first power converter 1122e, the second power converter 1133, the third power converter 1136 and the fourth power converter 1139 are respectively connected with the battery cell 1150.

The first controller 1111e and the second controller 1114e perform the control described in the first embodiment for all input currents from the charging terminal 1011X and the charging terminal 1011Y. The first controller 1111e and the second controller 1114e perform the control described in the second embodiment for all output currents to the output terminals 1016X and 1016Y. The priority may be set for each terminal.

Furthermore, like the third embodiment, a terminal for the data communication may be included in the output terminal 1016X and 1016Y and/or the charging terminal 1011X and 1011Y.

Embodiment 5

In the embodiments described above, an example was explained in which the battery pack 101 and the motor driving control apparatus 102 are implements as separate apparatuses. However, for purpose of the cost reduction and the like, as depicted in FIG. 26, the battery pack 101 and the motor driving control apparatus 102 may be implemented in an integrated form.

FIG. 26 depicts a functional block diagram of a battery pack 101f relating to this embodiment. The battery pack 101f includes the battery cell 1150, a controller 1110f and a motor driving controller 102b.

Except for one point that the controller 1110f is connected to the motor driving controller 102b without passing through any terminal, the controller 1110f is almost the same as the controller described in the third embodiment. The controller 1110f is connected with terminals 1019a to 1019d including a terminal for the data communication, for example, and can be perform the data communication with a portable apparatus 109b such as a smartphone through the terminals 1019a to 1019d and the cable. The battery cell 1150 is also the same as that in the first to fourth embodiments.

The portable apparatus 109b relating to this embodiment executes an application program that has a function, which the control panel 106, for example, conventionally has, in other words, a function that receives, from the user, an instruction input regarding whether or not the assist is required, a desired assist ratio if the assist is required and the like, and outputs the instruction input and the like to the battery pack 101f. Moreover, as described in the third embodiment, the application program of the portable apparatus 109b has a function to display data such as the travelling distance, the running time, the consumed calorie and an amount of regenerative power, which are results computed by the motor driving controller 102b, and a function to output the current amount or the amount of electrical power, which was charged through the controller 1110f and the terminal 1019, and the current amount or the amount of electrical power, which was outputted through the controller 1110f and the terminal 1019.

On the other hand, the motor driving controller 102b has a motor driving computer 1021 and an FET bridge 1022, and the FET bridge 1022 is connected with the motor 105 through a terminal 1161, and the motor driving computer 1021 is connected with the rotation sensor of the motor 105 through a terminal 1162, and with the torque sensor 103 and the pedal rotation sensor 104 through a terminal 1163. The motor driving computer 1021 controls the driving of the motor 105 by performing predetermined calculation based on signals from the rotation sensor of the motor 105, the torque sensor 103 and the pedal rotation sensor 104 to control switching of the FET bridge 1022.

The control panel 106 connected with the cable, which has a USB terminal, for example, may be connected to the terminal 1019.

Other Embodiments

In the aforementioned embodiments, an implementation example was described, in which the power converter 1122 is connected to the terminal for charging and discharging of the battery cell 1150, however, instead of this, the power converter 1122 may be connected with a source of the switch 1112, as depicted in FIG. 27.

Moreover, in the fifth embodiment, the functions of the motor driving control apparatus 102 are integrated into the battery pack 101, however, a mode is employed in which the battery pack 101 can be detached from the electrically assisted bicycle 1. However, the control relating to the first to third embodiments may be implemented in case where the integration with a frame of the electrically assisted bicycle 1 is further made.

Furthermore, in the first embodiment, a situation is described in which the current by the regeneration and the input current from the charging terminal 1011 occur, however, there is a case where, instead of the current by the regeneration, the output current for the motor driving may be outputted to the motor driving control apparatus 102. In such a case, it is only necessary to perform the control while assuming that the current by the regeneration is zero.

Moreover, in the second embodiment, a situation was described in which the output current for the motor driving and the output current to the output terminal 1016 occur, however, there is a case where, instead of the output current for the motor driving, the current by the regeneration is inputted from the motor driving control apparatus 102. In such a case, it is only necessary to perform the control while assuming that the output current for the motor driving is zero.

Although the embodiments of this invention were explained above, this invention is not limited to those. For example, a combination of the embodiments can be made, appropriately. Furthermore, as for a circuit configuration and/or the implementation method for realizing the aforementioned function, various methods can be employed.

When the implementation is made in a form that a housing is provided like the battery pack 101, the terminal is implemented as a connector, however, when viewed from the controller 1110 or the circuit board 1100 in the battery pack 101, no connector may be provided for the controller 1110 or the circuit board 1100, and a connecting part with a cable to be connected to the connector may be provided. Reversely, a connector may be provided for the controller 1110 or the circuit board 1100. Therefore, in view of both cases, they may be called "connecting parts".

Furthermore, in the aforementioned embodiments, an example was described in which the battery cell is included, however, a configuration may be modified so that an electrical power storage device such as a capacitor is employed. In such a case, the charging and discharging are controlled in conformity with the property of the capacitor.

Moreover, in the aforementioned embodiments, a connection was explained that the electrodes are contacted each other like the USB terminals, however, in case where the current flows contactlessly by a method such as the electromagnetic induction, a connection method may be employed in which an electrical connection is made although it is contactless. Furthermore, as for the data communication, instead of the connection by the cable, it may be performed by a short-range wireless communication such as Bluetooth (registered trademark).

At least part of the aforementioned first and second controllers may be realized by a dedicated semiconductor chip or by a processor executing a program. In case of the latter, as depicted in FIG. 28, a RAM (Random Access Memory) 4501, a processor 4503 and a ROM (Read Only Memory) 4507 are connected through a bus 4519. The program to perform the processing in this embodiment and an Operating System (OS) if it exists are stored in the ROM 4507, and are read out from the ROM 4507 to RAM 4501 when executed by the processor 4503. The ROM 4507 also records other parameters such as thresholds, and these parameters are also read out. The processor 4503 obtains measured values from sensors, and outputs instructions to related components. Data in the processing is stored in the RAM 4501. The processor 4503 may include the ROM 4507, and may further include the RAM 4501.

The aforementioned embodiments are summarized as follows:

A control apparatus relating to a first aspect of the embodiments has (A) a first connecting part, which is connected with a driving control apparatus for controlling driving of a power unit for assisting a human power or with the power unit, and through which a current relating to charging and discharging of an electrical power storage device flows; (B) a second connecting part, which is provided separately from the first connecting part, and through which a current relating to charging to the electrical power storage device flows via an electrical connection; and (C) a controller to control charging and discharging of the electrical power storage device, which are performed by using a current, which flows in the first connecting part and/or the second connecting part.

Thus, by providing the second connecting part, it becomes possible to charge the electrical power storage device by the current from the second connecting part in addition to the charging by the current due to the regeneration, for example. The connecting part includes not only the terminal, but also a connecting portion between electrical conductors such as other devices, cable, and electrical wires, and any connecting part in the noncontact electrical power supply and reception.

The aforementioned power unit may be a motor to assist movement of a mobile object, and the movement may be caused by the human power. For example, in case of the motor to assist the movement of the mobile object, which is caused by the human power, the capacity of the electrical power storage device is limited to a capacity which can be filled by the charging by a current supplied from another power supply device, for example, during of the movement of the mobile object in addition to the charging due to the regeneration. Therefore, it is possible to suppress the charging by a battery charger connected with a commercial power supply.

Moreover, the controller may function in a mode in which the charging to the electrical power storage device is performed by using a first current or electrical power and a second current or electrical power, when the first current or electrical power and the second current or electrical power are detected, wherein the first current or electrical power is supplied from the first connecting part and relates to the charging to the electrical power storage device, and the second current or electrical power is supplied from the second connecting part and relates to the charging to the electrical power storage device. There may be a mode to charge only from one connecting part.

Furthermore, the aforementioned controller may (c1) perform the charging to the electrical power storage device by putting priority on a first current or electrical power among the first current or electrical power and a second current or electrical power, wherein the first current or electrical power is supplied from the first connecting part and relates to the charging to the electrical power storage device, and the second current or electrical power is supplied from the second connecting part and relates to the charging to the electrical power storage device. Typically, this is because there is a case in which an influence appears in the driving of the mobile object, when the first current or electrical power is not prioritized.

In addition, the aforementioned controller (c2) may control the charging to the electrical power storage device so that a sum of a value of a first current or electrical power and a value of a second current or electrical power is equal to or less than a first predetermined value, or so that a sum of a ratio of a value of the first current or electrical power to a certain constant value and a ratio of a value of the second current or electrical power to the certain constant value is equal to or less than a second predetermined value, wherein the first current or electrical power is supplied from the first connecting part and relates to the charging to the electrical power storage device, and the second current or electrical power is supplied from the second connecting part and relates to the charging to the electrical power storage device. It becomes possible to appropriately charge according to the capability of the electrical power storage device. When the charging control is performed based on the ratio, it is useful when the capability of the electrical power storage device changes according to the state of the electrical power storage device.

Furthermore, the aforementioned controller (c3) may suppress charging by a current or electrical power, which is supplied from the first connecting part and relates to the charging to the electrical power storage device, when a current or electrical power is detected, which is supplied from the second connecting part and relates to the charging to the electrical power storage device, or when a current input or electrical power input through the second connecting part is requested. For example, this is for the cost reduction by simplifying the charging control.

Moreover, in a state where a value of a current or electrical power relating to the charging to the electrical power storage device is limited to a value less than an upper limit value, the aforementioned controller (c4) may suppress or stop charging by a current or electrical power, which is supplied from the second connecting part and relates to the charging to the electrical power storage device, when the current or electrical power is detected, which is supplied from the second connecting part and relates to the charging to the electrical power storage device, or when charging from the second connecting part is instructed. This is to further simplify the charging control.

Furthermore, the aforementioned controller (c5) may perform the charging to the electrical power storage device by putting priority on a second current or electrical power among a first current or electrical power and the second current or electrical power, wherein the first current or electrical power is supplied from the first connecting part and relates to the charging to the electrical power storage device, and the second current or electrical power is supplied from the second connecting part and relates to the charging to the electrical power storage device. For example, when a motor whose regenerative capability is low is used, or when the first connecting part is connected to the battery charger, which is connected to the commercial power supply, it is preferable to put priority on the second current or electrical power, as described above.

The battery charger may also be connected with the aforementioned first connecting part.

The control apparatus relating to the first aspect may further have (D) a third connecting part, which is provided separately from the first connecting part, and through which a current relating to discharging of the electrical power storage device flows via an electrical connection. In this case, the aforementioned controller (d1) may control outputs by putting priority on a third current or electrical power among the third current or electrical power and a fourth current or electrical power, wherein the third current or electrical power is outputted to the first connecting part and relates to the discharging of the electrical power storage device, and the fourth current or electrical power is outputted to the third connecting part and relates to the discharging of the electrical power storage device.

Thus, by providing the third connecting part, it becomes possible to output from the third connecting part in addition to the output to the power unit, for example. The third connecting part may be used commonly with the second connecting part. In addition, typically, this is because there is a case where an influence appears in the driving of the mobile object when the third current or electrical power is not prioritized.

In addition, the aforementioned controller (d2) may control the discharging of the electrical power storage device so that a sum of a value of a third current or electrical power and a value of a fourth current or electrical power is equal to or less than a third predetermined value, or so that a sum of a ratio of a value of the third current or electrical power to a certain constant value and a ratio of a value of the fourth current or electrical power to the certain constant value is equal to or less than a fourth predetermined value, wherein the third current or electrical power is outputted to the first connecting part and relates to the discharging of the electrical power storage device, and the fourth current or electrical power is outputted to the third connecting part and relates to the discharging of the electrical power storage device. It becomes possible to appropriately perform the discharging according to the capability of the electrical power storage device. When the discharging control is performed based on the ratio, it is useful when the capability of the electrical power storage device changes according to the state of the electrical power storage device.

Furthermore, the aforementioned controller (d3) may suppress a value of a current or electrical power, which is outputted to the first connecting part and relates to the discharging of the electrical power storage device, when a current or electrical power output through the third connecting part is requested. For example, this is for the cost reduction by simplifying the discharging control.

Moreover, in a state where a value of a current or electrical power relating to the discharging of the electrical power storage device is limited to a value less than an upper limit value, the aforementioned controller (d4) suppress or drop to zero a value of a current or electrical power, which is outputted to the third connecting part and relates to the discharging of the electrical power storage device, when a current or electrical power output through the third connecting part is request. This is to further simplify the discharging control.

Furthermore, the aforementioned controller may control outputs by putting priority on a fourth current or electrical power among a third current or electrical power and the fourth current or electrical power, wherein the third current or electrical power is outputted to the first connecting part and relates to the discharging of the electrical power storage device, and the fourth current or electrical power is outputted to the third connecting part and relates to the discharging of the electrical power storage device. For example, according to a type of a device (e.g. heat retention or maintenance of humidity), it is preferable to put priority on the fourth current or electrical power, as described above.

The control apparatus relating to the first aspect may further have (E) a fourth connecting part, which is provided separately from the first connecting part, and through which data input and/or output is performed with wired or wireless. Thus, it becomes possible to input data and/or output internal data to the outside.

Furthermore, the aforementioned controller (e1) may output, through the fourth connecting part, an amount of current or electrical power, which relates to the charging through the second connecting part. In addition, it (e1) may output, through the fourth connecting part, an amount of current or electrical power, which was outputted through the third connecting part. This is to output data that can be obtained by providing the second or third connecting part.

Furthermore, the aforementioned control apparatus may further have (F) a fifth connecting part, which is provided separately from the first connecting part, and through which data input and/or output is performed with wired or wireless. In this case, the aforementioned controller (f1) may output, through the fifth connecting part, an amount of current or electrical power, which relates to the charging through the second connecting part, when requested through the fifth connecting part. Moreover, the aforementioned controller (f2) may output, through the fifth connecting part, an amount of current or electrical power, which was outputted through the third connecting part, when requested through the fifth connecting part.

It is possible to configure an electrical power storage apparatus having the aforementioned control apparatus. Furthermore, it is possible to configure an electrical power storage apparatus having the aforementioned control apparatus and the driving control apparatus. Furthermore, it is possible to configure a system for a mobile object, which includes the aforementioned control apparatus.

A control apparatus relating to a second aspect of the embodiments has (A) a first connecting part, which is connected with a driving control apparatus for controlling driving of a power unit for assisting a human power or with the power unit, and through which a current relating to charging and discharging of an electrical power storage device flows; (B) a second connecting part, which is provided separately from the first connecting part, and through which a current relating to discharging of the electrical power storage device flows via an electrical connection; and (C) a controller to control charging and discharging of the electrical power storage device, which are performed by using a current, which flows in the first connecting part and/or the second connecting part.

A control method relating to a third aspect of the embodiments is executed by a charging and discharging control apparatus that comprises a first connecting part, which is connected with a driving control apparatus for controlling driving of a power unit for assisting a human power or with the power unit, and through which a current relating to charging and discharging of an electrical power storage device flows and a second connecting part, which is provided separately from the first connecting part, and through which a current relating to charging to the electrical power storage device flows via an electrical connection. Then, this control method includes (A) detecting a value of a first current or electrical power that is supplied from the first connecting part and relates to charging to the electrical power storage device; and (B) controlling the charging to the electrical power storage device (b1) so that a sum of the value of the first current or electrical power and a value of a second current or electrical power is equal to or less than a first predetermined value, or (b2) so that a sum of a ratio of the value of the first current or electrical power to a certain constant value and a ratio of a value of the second current or electrical power to the certain constant value is equal to or less than a second predetermined value, wherein the second current or electrical power is supplied from the second connecting part and relates to the charging to the electrical power storage device.

A control method relating to a fourth aspect of the embodiments is executed by a charging and discharging control apparatus that comprises a first connecting part, which is connected with a driving control apparatus for controlling driving of a power unit for assisting a human power or with the power unit, and through which a current relating to charging and discharging of an electrical power storage device flows and a second connecting part, which is provided separately from the first connecting part, and through which a current relating to discharging of the electrical power storage device flows via an electrical connection. Then, this control method includes (A) detecting a value of a first current or electrical power that is outputted to the first connecting part and relates to discharging of the electrical power storage device; and (B) controlling the discharging of the electrical power storage device (b1) so that a sum of the value of the first current or electrical power and a value of a second current or electrical power is equal to or less than a first predetermined value, or (b2) so that a sum of a ratio of the value of the first current or electrical power to a certain constant value and a ratio of a value of the second current or electrical power to the certain constant value is equal to or less than a second predetermined value, wherein the second current or electrical power is outputted to the second connecting part and relates to the discharging of the electrical power storage device.

The aforementioned configurations are not limited to matters described in the embodiments, and may be implemented by another configuration that can take substantially the same effects.

What is claimed is:

1. A control apparatus, comprising:
   a first connecting terminal, which is connected with a driving control circuit for controlling driving of a power circuit for assisting a human power or with the power circuit, and through which a current relating to charging and discharging of an electrical power storage device flows;
   a second connecting terminal, which is provided separately from the first connecting terminal, and through which a current relating to charging to the electrical power storage device flows via an electrical connection; and
   a controller configured to switch charging modes according to states in the electrical power storage device,
   wherein the controller is configured to perform the charging to the electrical power storage device in a first charging mode, upon detecting a first state in the electrical power storage device where a value of a current or electrical power relating to the charging to the electrical power storage device is limited to a value less than a maximum value defined for the electrical power storage device, and to perform the charging to the electrical power storage device in a second charging mode, upon detecting a second state in the electrical power storage device where the value of the current or electrical power relating to the charging to the electrical power storage device is allowed to be the maximum value, and
   in the first charging mode, the controller is configured to suppress or stop charging by a second current or electrical power that is supplied from the second connecting terminal and relates to the charging to the electrical power storage device and to put priority on charging by a first current or electrical power that is supplied from the first connecting terminal and relates to the charging to the electrical power storage device, even when the second current or electrical power is detected, or even when the charging from the second connecting terminal is instructed, and
   in the second charging mode, the controller is configured to control the charging to the electrical power storage device so that a sum of a value of the first current or electrical power and a value of the second current or electrical power is equal to or less than the maximum value, when the second current or electrical power is detected, or when the charging from the second connecting terminal is instructed.

2. The control apparatus as set forth in claim 1, further comprising a third connecting terminal, which is provided separately from the first connecting terminal, and through which a current relating to discharging of the electrical power storage device flows via a second electrical connection,
   wherein the controller is configured to control outputs by putting priority on a third current or electrical power among the third current or electrical power and a fourth current or electrical power, wherein the third current or electrical power is outputted to the first connecting terminal and relates to the discharging of the electrical power storage device, and the fourth current or electrical power is outputted to the third connecting terminal and relates to the discharging of the electrical power storage device.

3. The control apparatus as set forth in claim 2,
   further comprising a fourth connecting terminal, which is provided separately from the first connecting terminal, and through which data output is performed,
   wherein the controller is configured to output, through the fourth connecting terminal, an amount of current or electrical power, which has been outputted through the third connecting terminal.

4. The control apparatus as set forth in claim 2, further comprising a fifth connecting terminal, which is provided separately from the first connecting terminal, and through which data input and/or output is performed with wired or wireless, wherein the controller is configured to output, through the fifth connecting terminal, an amount of current or electrical power, which has been charged through the second connecting terminal, when requested through the fifth connecting terminal.

5. The control apparatus as set forth in claim 2, further comprising a fifth connecting terminal, which is provided separately from the first connecting terminal, and through which data input and/or output is performed with wired or wireless, wherein the controller is configured to output, through the fifth connecting terminal, an amount of current or electrical power, which has been outputted through the third connecting terminal, when requested through the fifth connecting terminal.

6. The control apparatus as set forth in claim 1, further comprising a third connecting terminal, which is provided separately from the first connecting terminal, and through which a current relating to discharging of the electrical power storage device flows via a second electrical connection, wherein the controller is configured to control the discharging of the electrical power storage device so that a sum of a value of a third current or electrical power and a value of a fourth current or electrical power is equal to or less than a first predetermined value, or so that a sum of a ratio of the value of the third current or electrical power to a certain constant value and a ratio of the value of the fourth current or electrical power to the certain constant value is equal to or less than a second predetermined value, wherein the third current or electrical power is outputted to the first connecting terminal and relates to the discharging of the electrical power storage device, and the fourth current or electrical power is outputted to the third connecting terminal and relates to the discharging of the electrical power storage device.

7. The control apparatus as set forth in claim 1, further comprising a third connecting terminal, which is provided separately from the first connecting terminal, and through which a current relating to discharging of the electrical power storage device flows via a second electrical connection, wherein the controller is configured to suppress a value of a current or electrical power, which is outputted to the first connecting terminal and relates to the discharging of the electrical power storage device, when a current or electrical power output through the third connecting terminal is requested.

8. The control apparatus as set forth in claim 1, further comprising a third connecting terminal, which is provided separately from the first connecting terminal, and through which a current relating to discharging of the electrical power storage device flows via a second electrical connection, wherein, in a state in the electrical power storage device where a value of a current or electrical power relating to the discharging of the electrical power storage device is limited to a value less than a second maximum value defined for the electrical power storage device, the controller is configured to suppress or drop to zero a value of a current or electrical power, which is outputted to the third connecting terminal and relates to the discharging of the electrical power storage device, when a current or electrical power output through the third connecting terminal is request.

9. The control apparatus as set forth in claim 1, further comprising a third connecting terminal, which is provided separately from the first connecting terminal, and through which a current relating to discharging of the electrical power storage device flows via a second electrical connection, wherein the controller is configured to control outputs by putting priority on a fourth current or electrical power among a third current or electrical power and the fourth current or electrical power, wherein the third current or electrical power is outputted to the first connecting terminal and relates to the discharging of the electrical power storage device, and the fourth current or electrical power is outputted to the third connecting terminal and relates to the discharging of the electrical power storage device.

10. The control apparatus as set forth in claim 1, further comprising a fourth connecting terminal, which is provided separately from the first connecting terminal, and through which data output is performed with wired or wireless, wherein the controller is configured to output, through the fourth connecting terminal, an amount of current or electrical power, which has been charged to the electrical power storage device through the second connecting terminal.

11. The control apparatus as set forth in claim 1, wherein, in the second charging mode, the controller is configured to restrict the charging to the electrical power storage device according to a first upper limit of the first current or power and a second upper limit of the second current or power, which are determined by proportionately dividing the maximum value at a fixed ratio.

12. A control apparatus, comprising:
a first connecting terminal, which is connected with a driving control circuit for controlling driving of a power circuit for assisting a human power or with the power circuit, and through which a current relating to charging and discharging of an electrical power storage device flows;
a second connecting terminal, which is provided separately from the first connecting terminal, and through which a current relating to discharging of the electrical power storage device flows via an electrical connection; and
a controller configured to switch discharging modes according to states in the electrical power storage device,
wherein the controller is configured to perform the discharging of the electrical power storage device in a first discharging mode, upon detecting a first state in the electrical power storage device where a value of a current or electrical power relating to the discharging of the electrical power storage device is limited to a value less than a maximum value defined for the electrical power storage device, and to perform the discharging of the electrical power storage device in a second discharging mode, upon detecting a second state in the electrical power storage device where the value of the current or electrical power relating to the discharging to the electrical power storage device is allowed to be the maximum value, and
in the first discharging mode, the controller is configured to suppress or stop the discharging with a second current or electrical power that is outputted from the second connecting terminal and relates to the discharging of the electrical power storage device and to put priority on discharging with a first current or electrical power that is outputted from the first connecting terminal and relates to the discharging of the electrical power storage device, even when the discharging to the second connecting terminal is instructed, and in the second discharging mode, the controller is configured to control the discharging of the electrical power storage device so that a sum of a value of the first current or electrical power and a value of the second current or electrical power is equal to or less than the maximum value, when the discharging to the second connecting terminal is instructed.

13. The control apparatus as set forth in claim 12, wherein, in the second discharging mode, the controller is configured to restrict the discharging of the electrical power storage device according to a first upper limit of the first current or power and a second upper limit of the second current or power, which are determined by proportionally dividing the maximum value at a fixed ratio.

* * * * *